(12) United States Patent
Kato et al.

(10) Patent No.: US 7,796,147 B2
(45) Date of Patent: Sep. 14, 2010

(54) OPTICAL SCANNER AND IMAGE-FORMING DEVICE HAVING THE SAME

(75) Inventors: Ryota Kato, Nagoya (JP); Yasuo Tamaru, Nagoya (JP); Jun Mihara, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 11/739,907

(22) Filed: Apr. 25, 2007

(65) Prior Publication Data

US 2007/0253052 A1 Nov. 1, 2007

(30) Foreign Application Priority Data

Apr. 28, 2006 (JP) .............................. 2006-125776

(51) Int. Cl.
*B41J 2/385* (2006.01)
*B41J 2/41* (2006.01)
*B41J 15/14* (2006.01)
*B41J 2/435* (2006.01)
*B41J 27/00* (2006.01)

(52) U.S. Cl. ..................... 347/134; 347/138; 347/152; 347/243; 347/245; 347/257; 347/263

(58) Field of Classification Search .................. None
See application file for complete search history.

(56) References Cited

U.S. PATENT DOCUMENTS 4,469,430 A * 9/1984 Terashima .................. 347/134
4,800,401 A * 1/1989 Sato et al. ................... 347/242
5,803,622 A * 9/1998 Mama et al. ................... 399/4
2005/0062836 A1* 3/2005 Nakajima ................... 347/225
2006/0001980 A1* 1/2006 Namba ........................ 359/649
2007/0252890 A1 11/2007 Kato et al.

FOREIGN PATENT DOCUMENTS

| JP | 6194588 | 7/1994 |
|---|---|---|
| JP | 2002162592 | 6/2002 |
| JP | 2004054012 | 2/2004 |
| JP | 2004262182 | 9/2004 |
| JP | 2004262182 A * | 9/2004 |
| JP | 2004333799 | 11/2004 |
| JP | 2005157030 | 6/2005 |
| KR | 2006/0019729 A * | 3/2006 |

* cited by examiner

*Primary Examiner*—Matthew Luu
*Assistant Examiner*—Kendrick X Liu
(74) *Attorney, Agent, or Firm*—Banner & Witcoff, Ltd.

(57) ABSTRACT

An optical scanner includes a light source, a polygon mirror, an optical member, a casing, and an exit hole cover. The light source emits a light beam. The polygon mirror rotates and deflects the light beam to be scanned in a scanning direction. The optical member focuses the light beam deflected by the polygon mirror onto a scanning target. The casing houses the polygon mirror and the optical member and includes a first wall portion having a wall inner surface opposing the polygon mirror and the optical member and a wall outer surface opposing the scanning target. The first wall portion is formed with an exit hole through which the light beam is irradiated toward the scanning target. The exit hole cover is formed of a light transmissible member and is disposed on the wall outer surface to cover the exit hole.

13 Claims, 18 Drawing Sheets

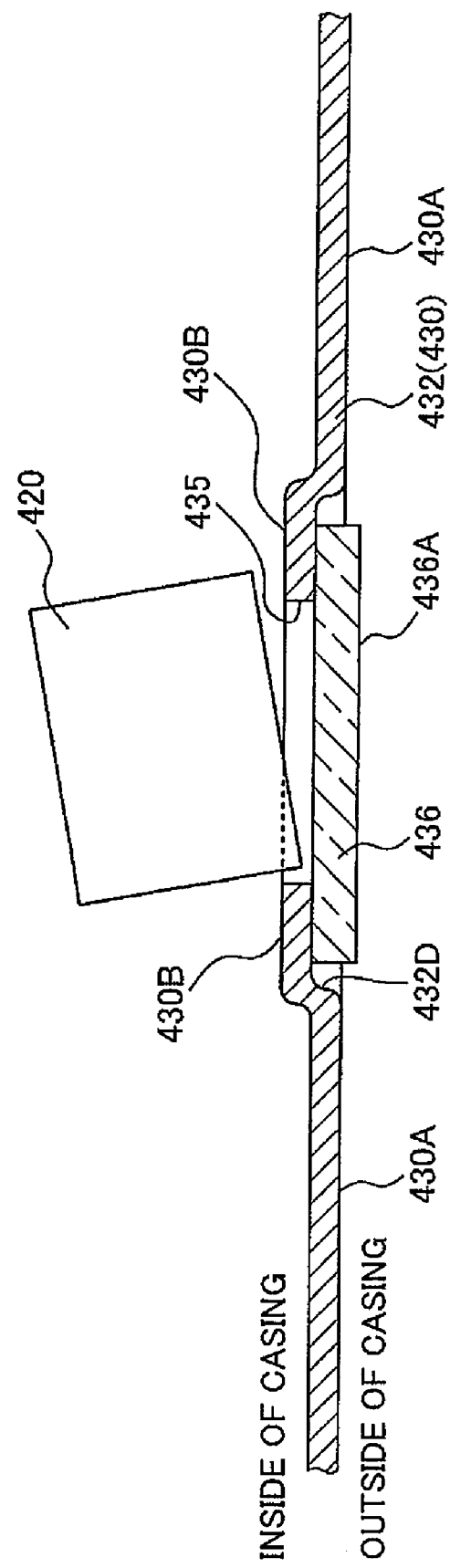

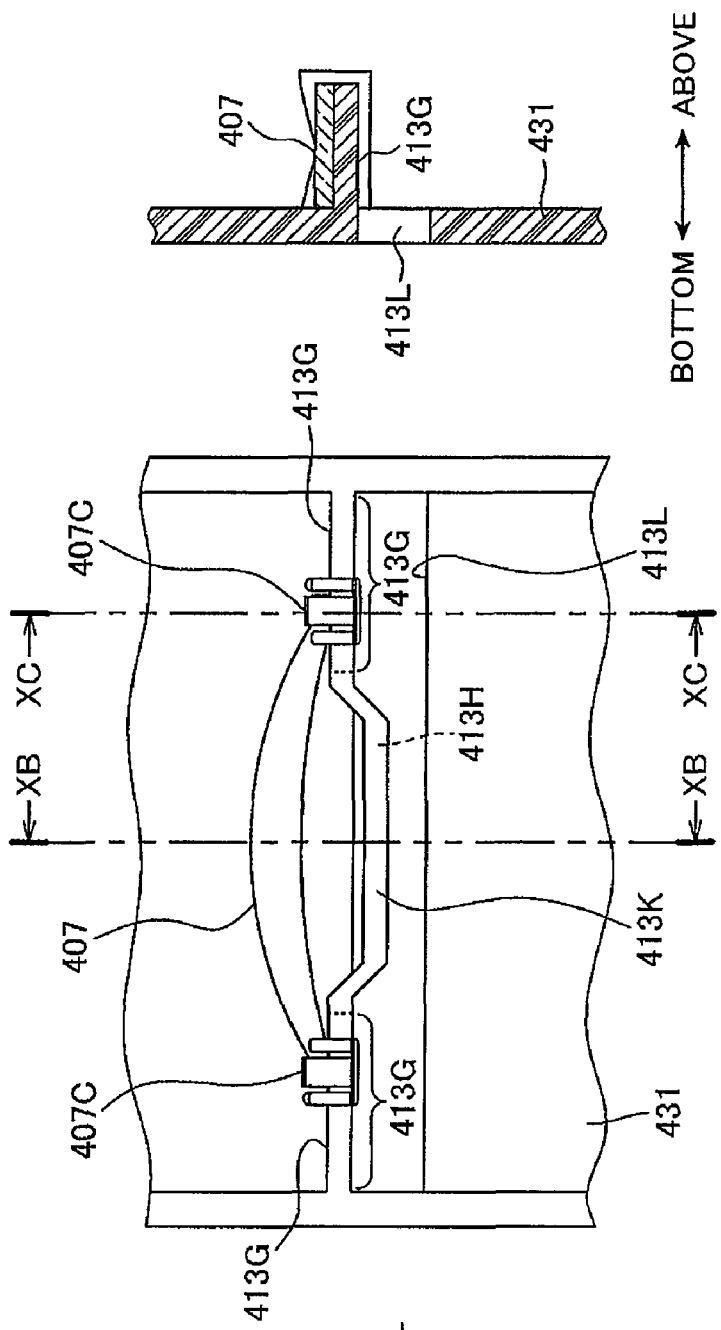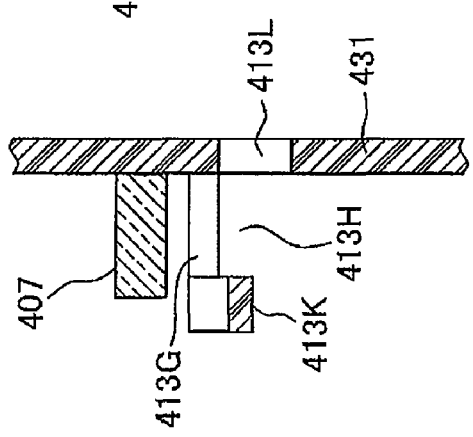

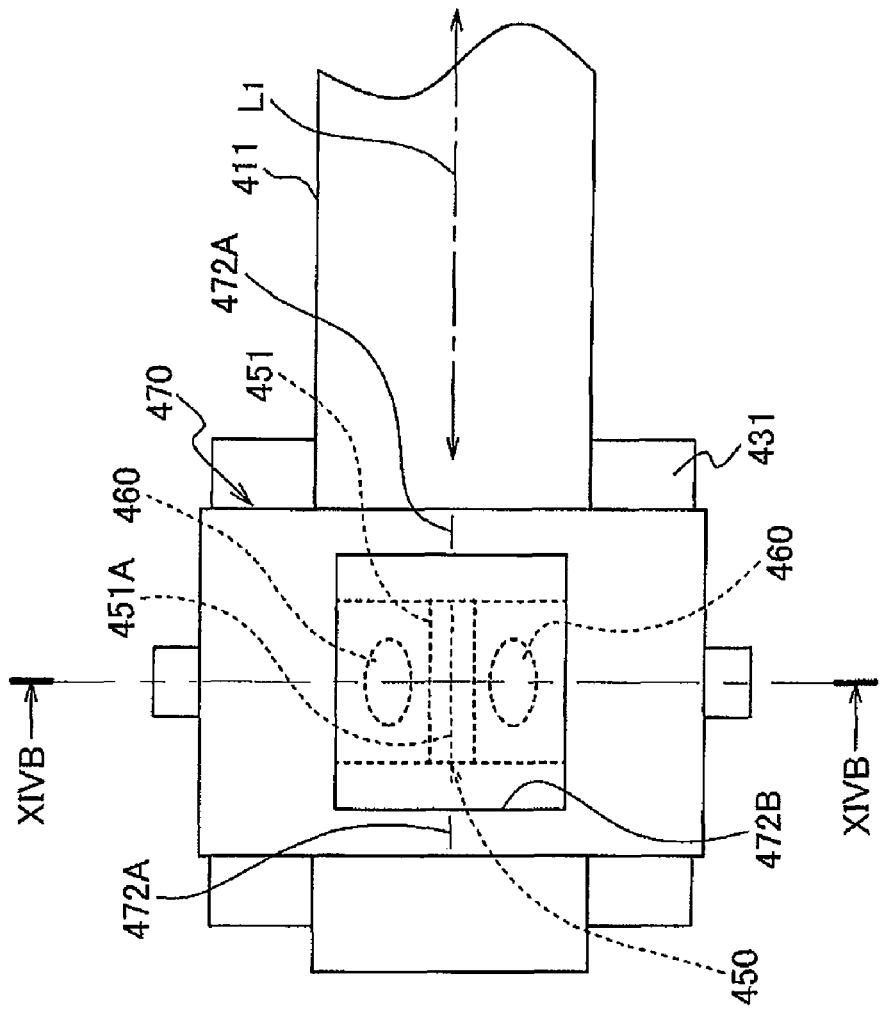
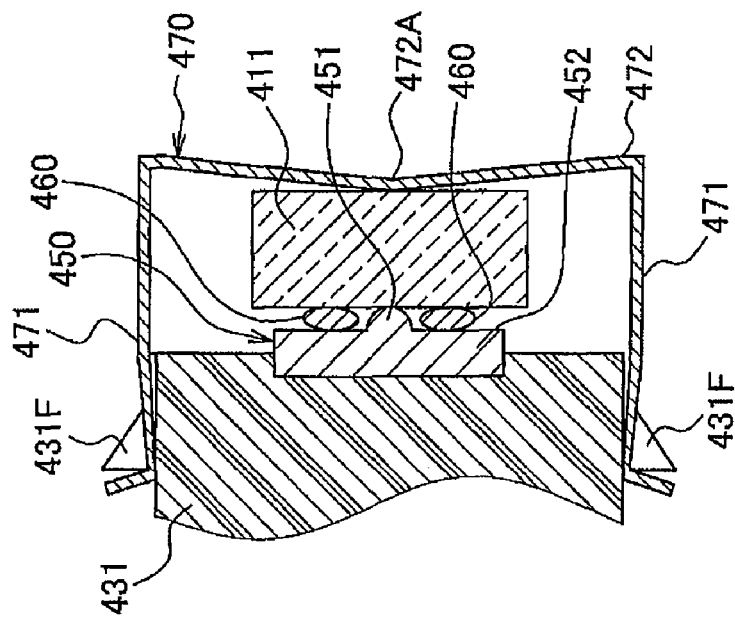

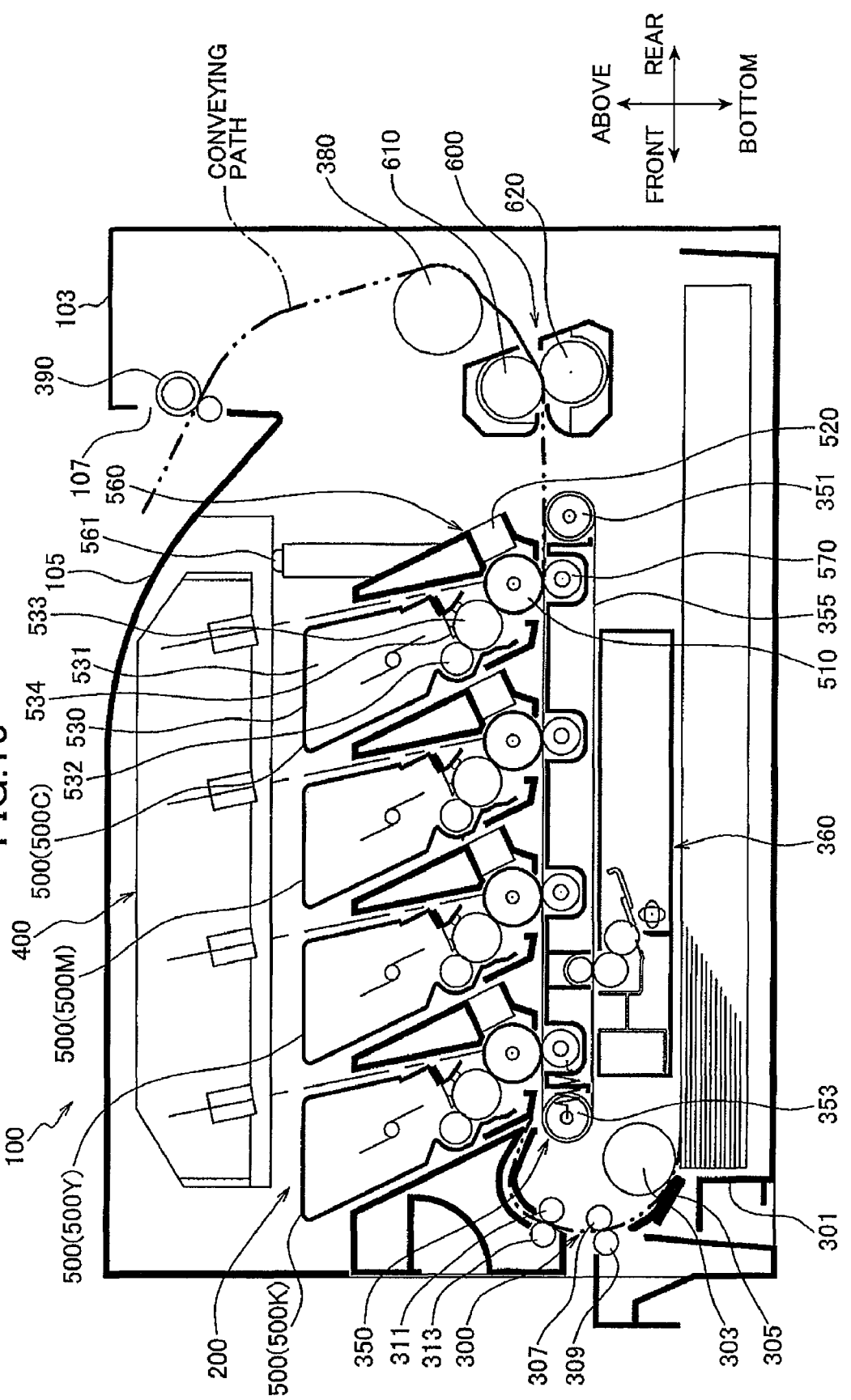

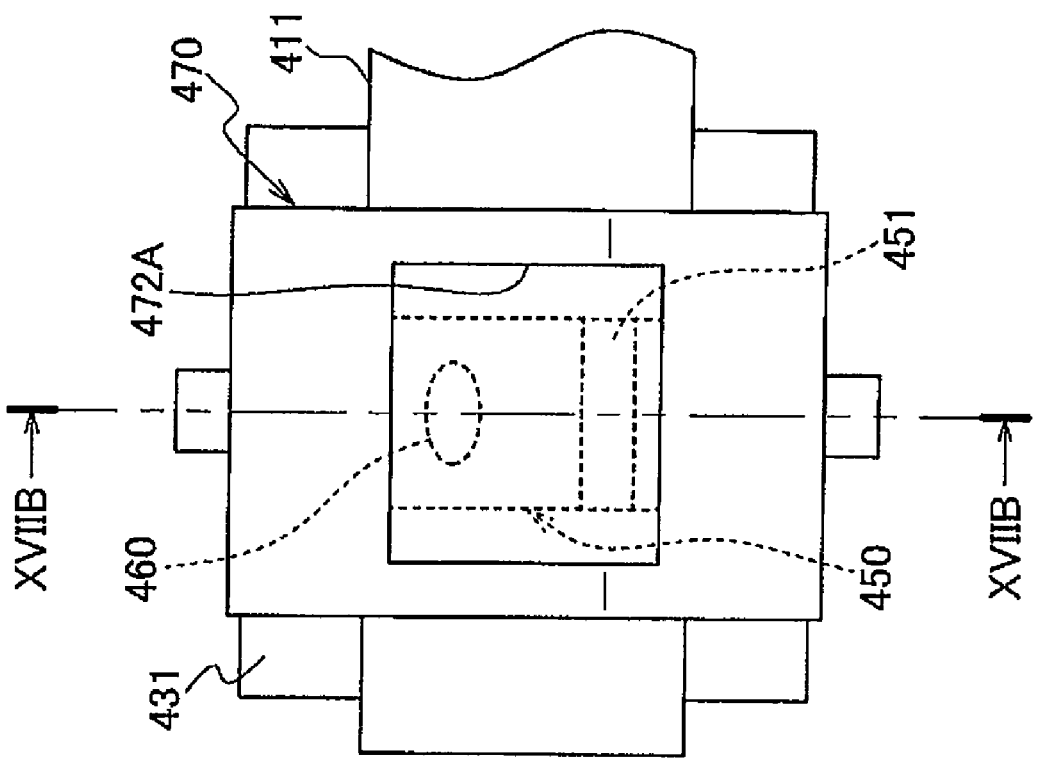
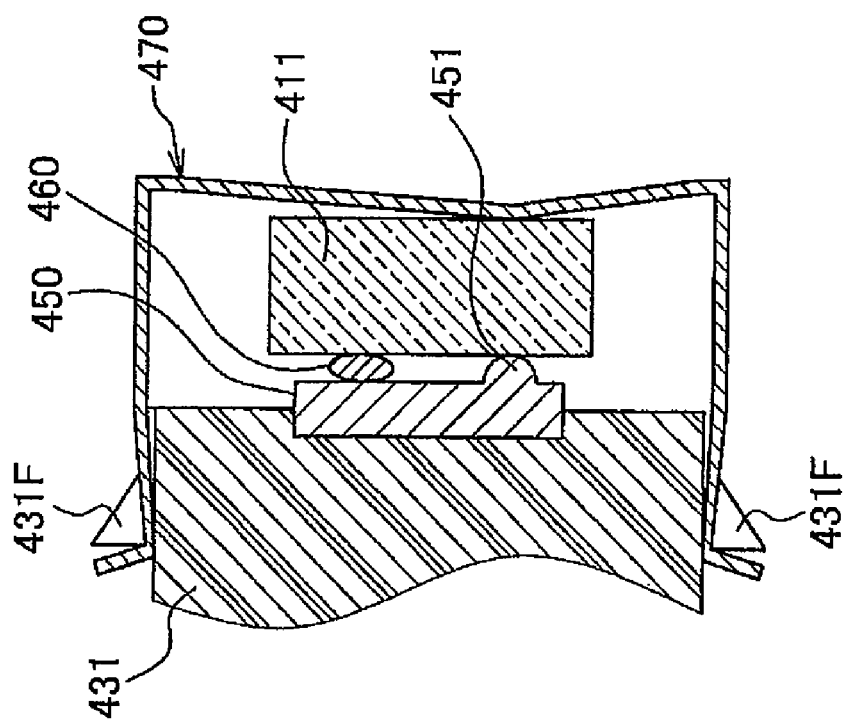

OPTICAL SCANNER AND IMAGE-FORMING DEVICE HAVING THE SAME

BACKGROUND OF THE INVENTION

1. Field of the Invention

The present invention relates to an optical scanner that scans a light beam, and particularly to an optical scanner employed in the scanning device of an electrophotographic image-forming device.

2. Description of Related Art

Electrophotographic image-forming devices, such as laser printers, employ an optical scanner (scanning device) to emit a beam of light onto a photosensitive drum, enabling the exposed regions of the drum to carry a toner image. The toner image carried on the photosensitive drum is subsequently transferred onto a recording medium, such as paper or a transparency, forming an image thereon.

The optical scanner is configured of a light source, a rotating polygon mirror, and imaging means, including mirrors and lenses. Normally, at least the polygon mirror and the imaging means are accommodated in a casing for protection from dust.

Since the optical scanner emits light beams for exposing photosensitive drums in the electrophotographic image-forming device, exit holes are formed in the casing of the optical scanner to allow passage of the light beams. Image-forming devices, such as that disclosed in Japanese unexamined patent application publication No. HEI-6-194588, are provided with transparent covers formed of glass or the like (hereinafter referred to as an exit hole covers) to seal the exit holes, thereby protecting the polygon mirror, imaging means, and the like from dust particles.

However, since the image-forming devices disclosed in Japanese unexamined patent application publication No. HEI-6-194588 deflects and scans light beams emitted from the light sources by rotating the polygon mirror, the rotating motion of the polygon mirror agitates air in the casing, producing airflow. Consequently, air outside the casing is drawn into the casing through gaps between the exit hole cover and casing.

Of the gaps between the exit hole cover and casing in fluid communication with the region outside the casing, some gaps are too small to allow the passage of dust particles. These gaps act as a filter and trap and accumulate dust particles therein.

At this time, if the exit hole cover 436 is disposed on the inside of the casing 430 with the exit hole 435 exposed on the outside of the casing, as shown in FIG. 11A, dust particles that cannot pass through gaps between the exit hole cover 436 and the casing 430 accumulate in edges of the exit hole 435, obstructing the same.

In other words, the construction employed in Japanese unexamined patent application publication No. HEI-6-194588 is problematic in that dust particles tend to accumulate on the exit hole covers, obstructing the exit holes.

SUMMARY OF THE INVENTION

In view of the foregoing it is an object of the present invention to prevent the accumulation of dust particles that can obstruct the exit holes.

In order to attain the above and other objects, the present invention provides an optical scanner including a light source, a polygon mirror, an optical member, a casing, and an exit hole cover. The light source emits a light beam. The polygon mirror rotates and deflects the light beam to be scanned in a scanning direction. The optical member focuses the light beam deflected by the polygon mirror onto a scanning target. The casing houses the polygon mirror and the optical member and includes a first wall portion having a wall inner surface opposing the polygon mirror and the optical member and a wall outer surface opposing the scanning target. The first wall portion is formed with an exit hole through which the light beam is irradiated toward the scanning target. The exit hole cover is formed of a light transmissible member and is disposed on the wall outer surface to cover the exit hole.

Another aspect of the present invention provides an image-forming device including an image-carrying member and an optical scanner. A laser beam is scanned on the image-carrying member to form an image on a recording medium. The optical scanner including a light source, a polygon mirror, an optical member, a casing, and an exit hole cover. The light source emits a light beam. The polygon mirror rotates and deflects the light beam to be scanned in a scanning direction. The optical member focuses the light beam deflected by the polygon mirror onto the image-carrying member. The casing houses the polygon mirror and the optical member and includes a wall portion having a wall inner surface opposing the polygon mirror and the optical member and a wall outer surface opposing the image-carrying member. The wall portion is formed with an exit hole through which the light beam is irradiated toward the image-carrying member. The exit hole cover is formed of a light transmissible member and is disposed on the wall outer surface to cover the exit hole.

Another aspect of the present invention provides an image-forming device including an image-carrying member, an optical scanner, a main body, and a process cartridge. A laser beam is scanned on the image-carrying member to form an image on a recording medium. The optical scanner including a light source, a polygon mirror, an optical member, a casing, and an exit hole cover. The light source emits a light beam. The polygon mirror rotates and deflects the light beam to be scanned in a scanning direction. The optical member focuses the light beam deflected by the polygon mirror onto the image-carrying member. The casing houses the polygon mirror and the optical member and includes a wall portion having a wall inner surface opposing the polygon mirror and the optical member and a wall outer surface opposing the image-carrying member. The wall portion is formed with an exit hole through which the light beam is irradiated toward the image-carrying member. The exit hole cover is formed of a light transmissible member and is disposed on the wall outer surface to cover the exit hole. The optical scanner is mounted on the main body. The process cartridge accommodates toner to be supplied to the image-carrying member and is detachably mounted on the main body. The process cartridge includes a cleaning member configured to face the exit hole cover to clean the exit hole cover when the process cartridge is mounted on or detached from the main body.

BRIEF DESCRIPTION OF THE DRAWINGS

The above and other objects, features and advantages of the invention will become more apparent from reading the following description of the preferred embodiments taken in connection with the accompanying drawings in which:

FIG. 9 is an enlarged view of a part B shown in FIG. 3;

FIG. 10A is an enlarged view of a part A shown in FIG. 2;

FIG. 10B is a cross-sectional view along a line XB-XB shown in FIG. 10A;

FIG. 10C is a cross-sectional view along a line XC-XC shown in FIG. 10A;

FIG. 14A is a view of the mirror and scanning frame from the viewpoint indicated by an arrow C in FIG. 12;

FIG. 14B is a cross-sectional view along a line XIVB-XIVB shown in FIG. 14A;

FIG. 15 is a cross-sectional view showing a laser printer according to a second embodiment of the present invention;

FIG. 17A is a plan view showing a mirror mounted on the scanner frame according to a third embodiment of the present invention;

FIG. 17B is a cross-sectional view along a line XVIIB-XVIIB shown in FIG. 17A;

DETAILED DESCRIPTION OF THE PREFERRED EMBODIMENTS

Figure 1:
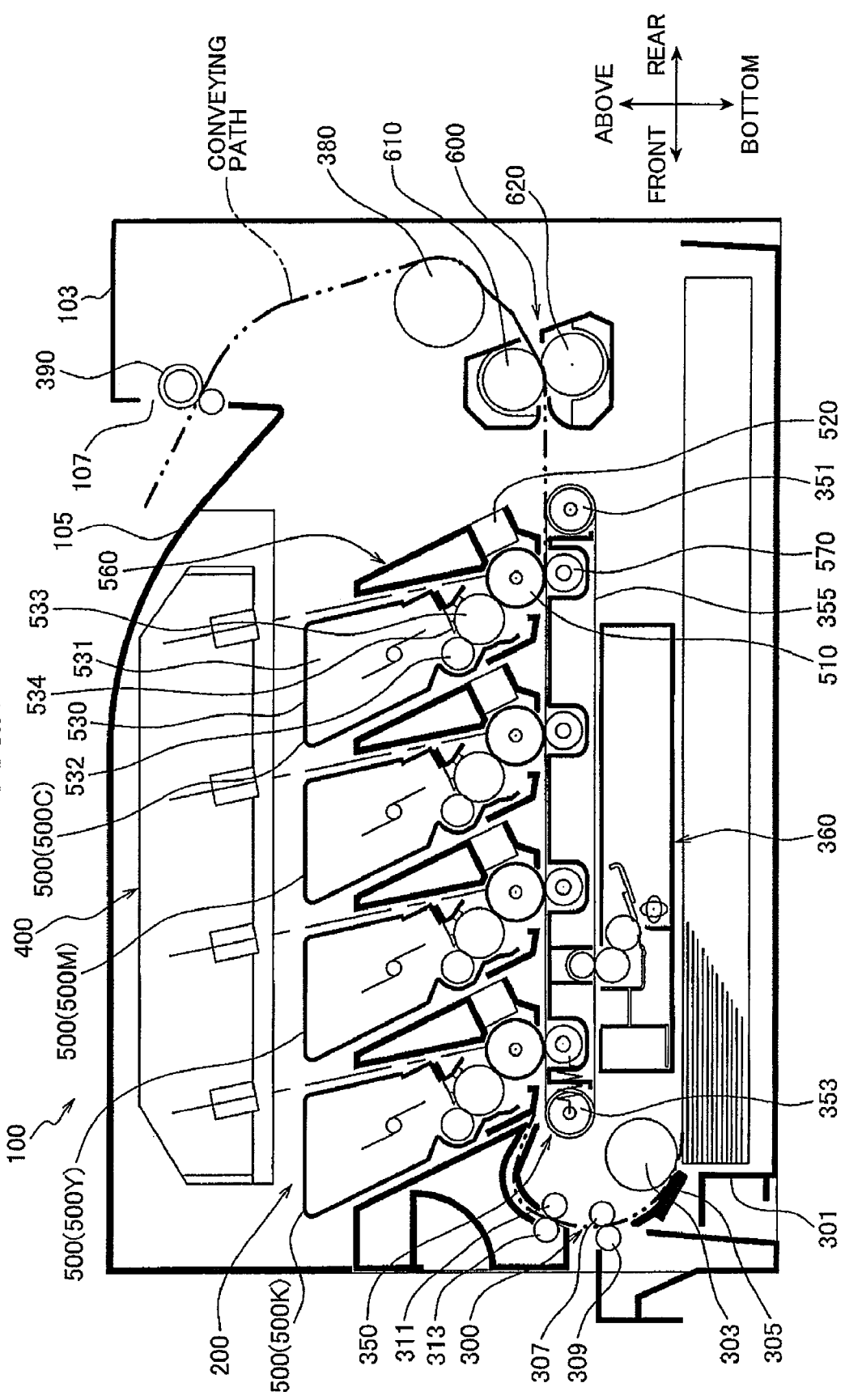
FIG. 1 is a side cross-sectional view of a laser printer according to a preferred embodiment of the present invention.

An optical scanner according to preferred embodiments of the present invention will be described while referring to the accompanying drawings wherein like parts and components are designated by the same reference numerals to avoid duplicating description.

In the following description, the expressions "front", "rear", "upper", "lower", "right", and "left" are used to define the various parts when the optical scanner is disposed in an orientation in which it is intended to be used.

In the preferred embodiments, the optical scanner according to the present invention is applied to an electrophotographic color laser printer. Next, the preferred embodiments will be described while referring to the accompanying drawings.

First Embodiment

FIG. 1 is a side cross-sectional view showing the primary components of a laser printer 100. The laser printer 100 includes a substantially box-shaped (cubical) casing 103. A discharge tray 105 is provided on the top surface of the casing 103 for receiving and holding a recording medium, such as paper or transparencies (hereafter simply referred to as "paper"), discharged from the casing 103 after a printing operation.

The casing 103 accommodates a feeding unit 300 for supplying paper to be printed, a conveying mechanism 350 for conveying paper fed from the feeding unit 300, and an image-forming unit 200 for forming images on the paper. The image-forming unit 200 includes four process cartridges 500K, 500Y, 500M, and 500C.

After the image-forming unit 200 has formed an image on the paper, an intermediate conveying roller 380 and a discharge chute (not shown) convey the paper upward in a paper-conveying direction that changes about 180 degrees. Subsequently, a discharge roller 390 discharges the paper through a discharge opening 107 onto the discharge tray 105.

The feeding unit 300 includes a paper tray 301 accommodated in the lowermost section of the casing 103, a feeding roller 303 for feeding (conveying) paper stacked in the paper tray 301 to the image-forming unit 200, and a separating pad 305 for separating the sheets of paper so that the paper is fed by the feeding roller 303 one sheet at a time.

Paper fed from the paper tray 301 is conveyed along a U-shaped path in the front side of the casing 103 so as to be conveyed toward the image-forming unit 200 disposed substantially in the center of the casing 103. Provided along this paper-conveying path from the paper tray 301 to the image-forming unit 200 are a conveying roller 307, a pinch roller 309 for pressing the paper against the conveying roller 307, a registration roller 311 disposed farther downstream from the conveying roller 307 in the paper-conveying direction, and a registration roller 313 disposed in opposition to the registration roller 311.

The conveying mechanism 350 is configured of a drive roller 351, a follow roller 353, and a conveying belt 355 looped around the drive roller 351 and follow roller 353. When the drive roller 351 rotates so that the top side of the conveying belt 355 moves in the paper-conveying direction, a sheet of paper fed from the paper tray 301 onto the conveying belt 355 is conveyed sequentially to each of the four process cartridges 500K, 500Y, 500M, and 500C in a direction toward the rear of the laser printer 100.

In the preferred embodiment, a belt cleaner 360 is disposed on the bottom side of the conveying mechanism 350 for removing waste toner deposited on the surface of the conveying belt 355.

The image-forming unit 200 includes a scanning unit 400, the four process cartridges 500K, 500Y, 500M, and 500C, a fixing unit 600, and four transfer rollers 570 corresponding to the four process cartridges 500K, 500Y, 500M, and 500C.

The image-forming unit 200 according to the preferred embodiment is a direct tandem type system capable of printing color images. In the preferred embodiment, the four process cartridges 500K, 500Y, 500M, and 500C correspond to the toner colors black (K), yellow (Y), magenta (M), and cyan (C) and are arranged in a series along the paper-conveying direction from the upstream side to the downstream side in the order given above. The process cartridges 500K, 500Y, 500M, and 500C have the same configuration, differing only in the color of toner used. Therefore, the process cartridges 500K, 500Y, 500M, and 500C will be referred to collectively as "process cartridges 500" below. Each of the process cartridges 500 is provided with a corresponding photosensitive drum 510 (i.e., photosensitive drums 510K, 510Y, 510M, and 510C).

The scanning unit 400 functions to irradiate laser beams onto the photosensitive drums 510, forming an electrostatic latent image on the surfaces of the photosensitive drums 510 exposed to the laser beam. In the preferred embodiment, the scanning unit 400 employs the optical scanner according to the present invention.

As shown in FIG. 1, the scanning unit 400 is disposed in the upper section of the casing 103 above the process cartridges 500. Laser beams are irradiated toward the photosensitive drums 510 through the bottom surface of the scanning unit 400. The scanning unit 400 will be described in greater detail later.

As shown in FIG. 1, the process cartridge 500 is detachably mounted in the casing 103 below the scanning unit 400. The process cartridge 500 includes the photosensitive drum 510, a charger 520, a toner accommodating section 530, and the like accommodated in a casing 560.

The transfer roller 570 is rotatably supported in a main frame 110 (see FIG. 4) at a position opposing the photosensitive drum 510 with the conveying belt 355 interposed therebetween. In the preferred embodiment, the four process cartridges 500 are accommodated in a single casing 560 so that the four process cartridges 500 can be integrally mounted in the main frame 110.

The photosensitive drum 510 functions to carry an image to be transferred onto the paper. The charger 520 functions to charge the surface of the photosensitive drum 510. The transfer roller 570 functions to transfer toner carried on the surface of the photosensitive drum 510 to the printing surface of the paper.

The toner accommodating section 530 is configured of a toner chamber 531 for accommodating toner, a supply roller 532 for supplying toner onto the photosensitive drum 510, a developing roller 533, and the like. The toner accommodating section 530 according to the preferred embodiment is detachably mounted in the casing 560.

The supply roller 532 rotates to supply toner accommodated in the toner chamber 531 toward the developing roller 533. Toner supplied toward the developing roller 533 is carried on the surface thereof, while a thickness-regulating blade 534 regulates the thickness of toner carried on the surface of the developing roller 533 to maintain a uniform thickness. Subsequently, the developing roller 533 supplies the uniform layer of toner onto the surface of the photosensitive drum 510 exposed by the scanning unit 400.

The fixing unit 600 uses heat to melt the toner transferred onto the paper for fixing the toner to the paper. The fixing unit 600 is detachably mounted in the main frame 110. The fixing unit 600 includes a heating roller 610, a pressure roller 620, and the like.

The image-forming unit 200 forms images on paper as follows. Specifically, the charger 520 provides a uniform charge on the surface of the photosensitive drum 510 as the photosensitive drum 510 rotates. Subsequently, the scanning unit 400 irradiates a laser beam onto the photosensitive drum 510, exposing the surface of the photosensitive drum 510 with a high-speed scan. In this way, the scanning unit 400 forms an electrostatic latent image on the surface of the photosensitive drum 510 corresponding to an image to be formed on the paper.

Next, as the developing roller 533 rotates, the positively charged toner carried on the surface of the developing roller 533 is selectively supplied onto the surface of the photosensitive drum 510 when the toner comes into contact therewith. The supplied toner develops the electrostatic latent image on the photosensitive drum 510 into a visible image so that a toner image produced according to reverse development is carried on the surface of the photosensitive drum 510.

Subsequently, a transfer bias applied by the transfer roller 570 causes the toner image carried on the surface of the photosensitive drum 510 to transfer onto the paper. Next, the paper is conveyed to the fixing unit 600, where the toner image newly transferred onto the paper is heated and fixed to the paper, thereby completing image formation.

Next, the scanning unit 400 according to the preferred embodiment will be described in detail with reference to FIGS. 2-14B.

Figure 2:
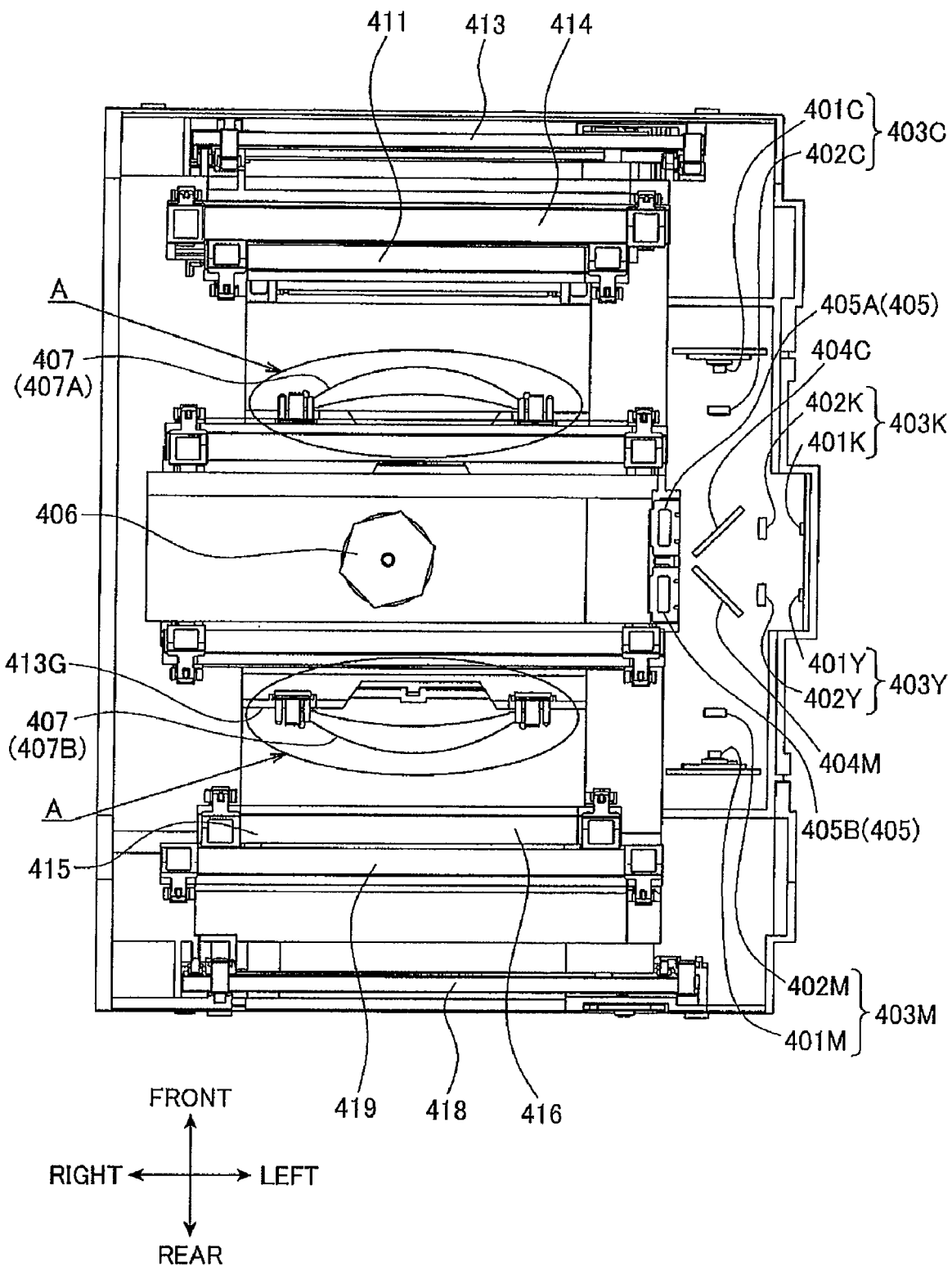
FIG. 2 is a plan view showing the overall structure of a scanning unit according to the preferred embodiment.
Figure 3:
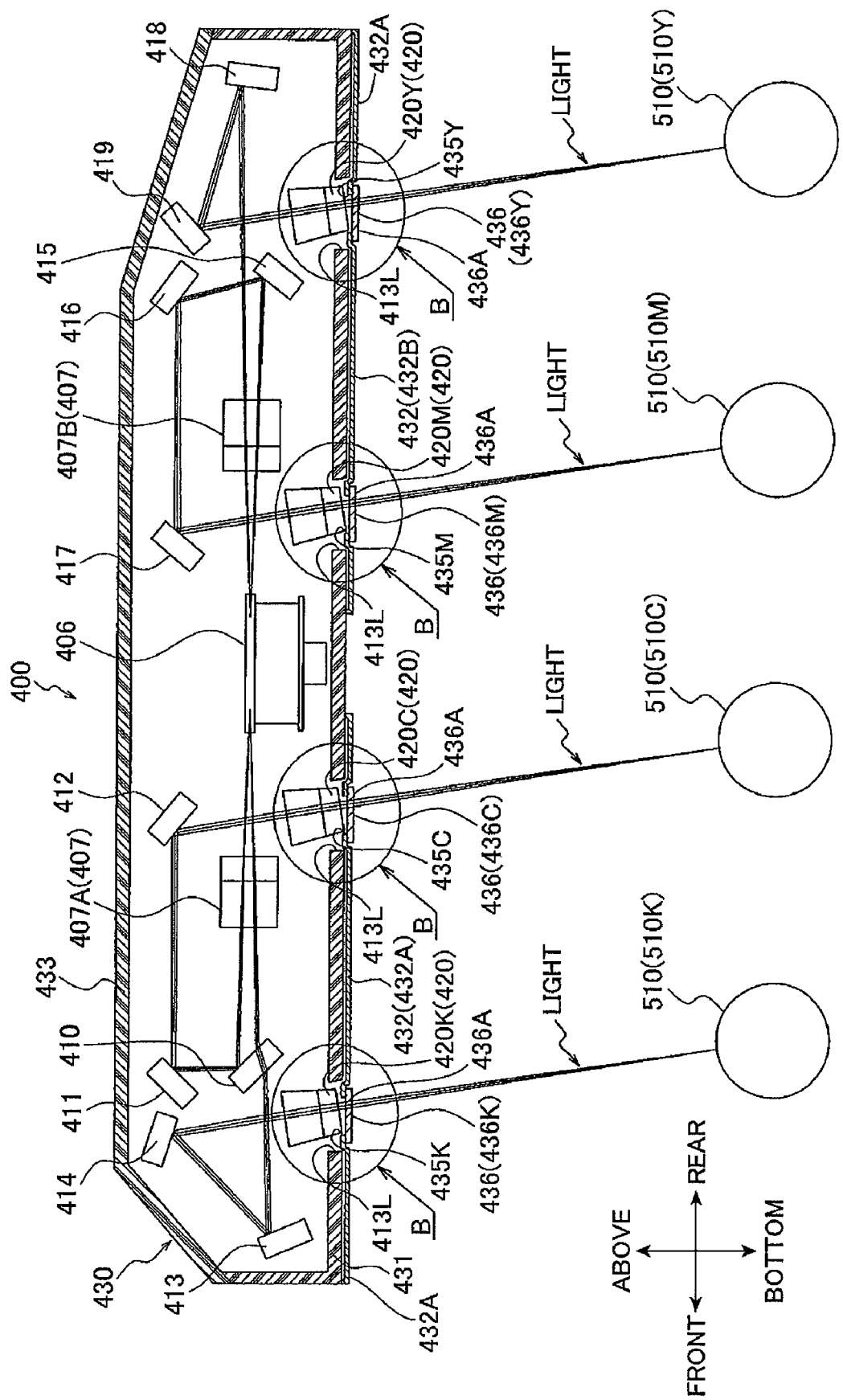
FIG. 3 is a side cross-sectional view showing the overall structure of the scanning unit.

FIG. 2 is a plan view showing the general structure of the scanning unit 400. For the sake of description, corners 431G described later have been omitted from FIG. 2. FIG. 3 is a side cross-sectional view showing the overall structure of the scanning unit 400. As shown in FIG. 2, the scanning unit 400 has four light sources 403K, 403Y, 403M, 403C (hereinafter collectively referred to as "light sources 403").

The light sources 403K, 403Y, 403M, 403C irradiate light onto the respective photosensitive drums 510K, 510Y, 510M, and 510C shown in FIG. 3. Each of the light sources 403K, 403Y, 403M, 403C has a respective semiconductor laser 401K, 401Y, 401M, and 401C (hereinafter collectively referred to as "semiconductor lasers 401") for emitting a laser light, and a respective collimator lens 402K, 402Y, 402M, and 402C (hereinafter collectively referred to as "collimator lenses 402"). Each collimator lens 402 is provided on the front surface of the respective semiconductor laser 401 for converting divergent rays emitted from the semiconductor laser 401 into parallel rays forming a beam.

A mirror 404C deflects light emitted from the light source 403C approximately 90 degrees toward a cylindrical lens 405A. A mirror 404M deflects light emitted from the light source 403M approximately 90 degrees toward a cylindrical lens 405B.

Light guiding parts (not shown) are provided in regions shifted toward the far side in the drawing relative to the mirror 404C and mirror 404M, respectively, for guiding light emitted from the light source 403K to the cylindrical lens 405A and light emitted from the light source 403Y to the cylindrical lens 405B.

As shown in FIG. 3, light from the light sources 403C and 403K guided to the cylindrical lens 405A is refracted by the cylindrical lens 405A and irradiated onto reflecting surfaces of a polygon mirror 406 at different angles of incidence. Similarly, light from the light sources 403Y and 403M guided to the cylindrical lens 405B is refracted by the cylindrical lens 405B and irradiated onto reflecting surfaces of the polygon mirror 406 at differing angles of incidence.

The polygon mirror 406 is configured of a rotating multifaceted mirror configured of reflecting mirrors arranged in a polygonal (hexagonal in the preferred embodiment) shape. The polygon mirror 406 functions to deflect and scan light emitted from the light sources 403 when rotated by an electric motor (not shown). The laser beam is scanned in the left-to-right direction of FIG. 2 at a constant angular velocity.

The fθ lenses 407A and 407B (hereinafter collectively referred to as "fθ lenses 407") function to convert the constant angular velocity in which the polygon mirror 406 scans the laser beam in the left-to-right direction of FIG. 2 into a constant linear velocity in which the laser beam is scanned over the photosensitive drum 510.

As shown in FIG. 3, optical members configured of a plurality of mirrors 410-419, toric lenses 420K, 420Y, 420M, and 420C (hereinafter collectively referred to as "toric lenses 420"), and the like focus the laser beams onto the photosensitive drums 510 after the fθ lenses 407 have converted the scanning velocity of the beams.

The toric lenses 420 are lenses that have different curvatures in the main scanning direction and subscanning direction of the laser beam. The toric lenses 420 function to correct face angle error by deflecting in the subscanning direction light reflected by the polygon mirror 406 in a direction different from the regulated direction.

Figure 4:
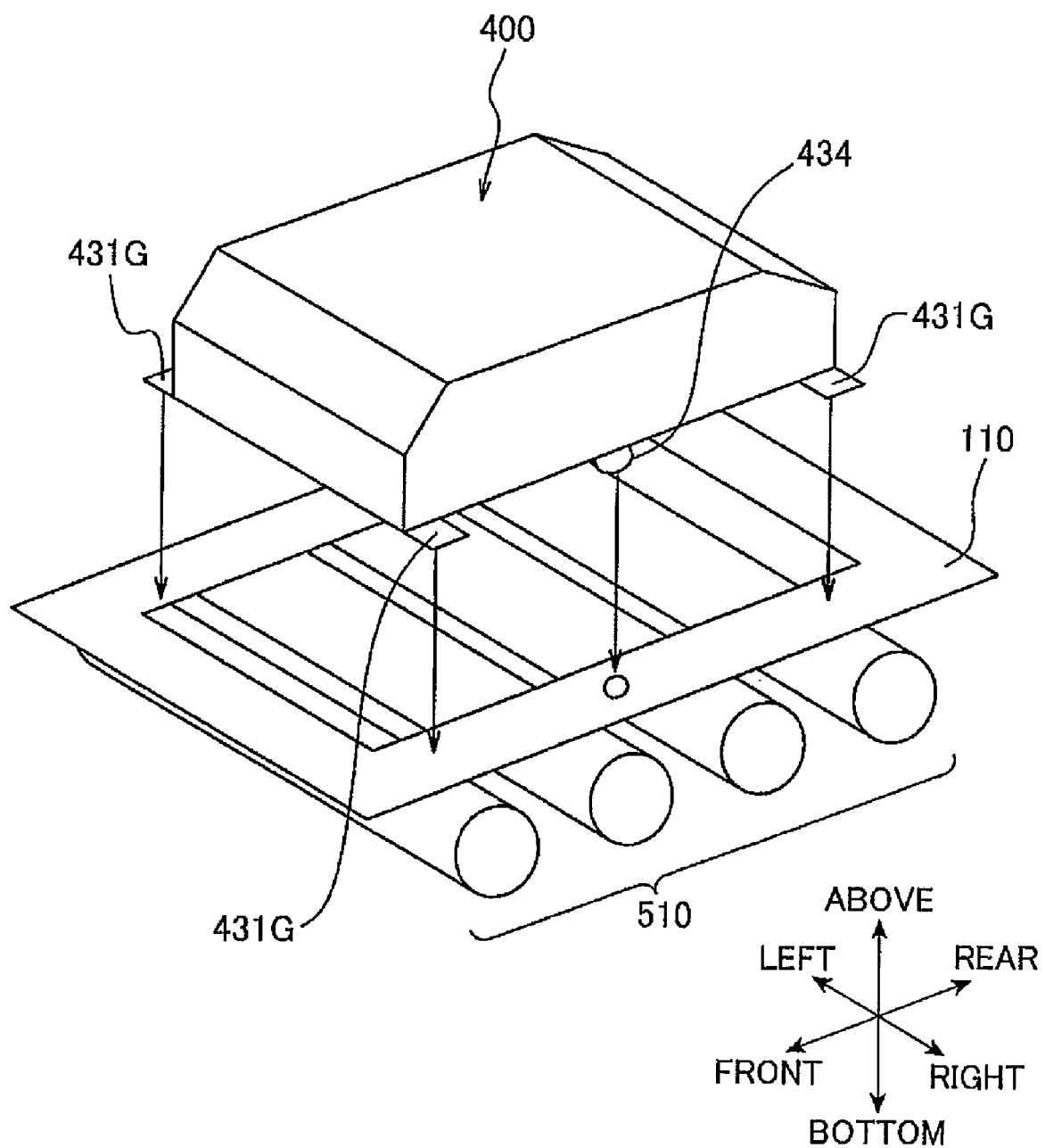
FIG. 4 is an exploded perspective view showing the scanning unit and main frame according to the preferred embodiment.

With this construction, as shown in FIGS. 3 and 4, light emitted from the light sources 403 based on image data passes through the cylindrical lenses 405A and 405B (hereinafter collectively referred to as the "cylindrical lenses 405") and is deflected and scanned by the polygon mirror 406, while the scanning speed is converted to a constant linear velocity by the fθ lenses 407. Subsequently, the mirrors 410-419 bend the optical axis of the light beams so that the beams are irradiated on the photosensitive drums 510 via the toric lenses 420, forming images thereon.

Of the mirrors 410-419, the mirror 410 does not reflect all light. Specifically, the mirror 410 reflects light emitted from the light source 403C toward the mirror 411, but refracts and passes light emitted from the light source 403K toward the mirror 413.

However, if dust particles become deposited on the surfaces of the mirrors or lenses, i.e., the polygon mirror 406, mirrors 410-419, fθ lenses 407, and toric lenses 420, the scanning unit 400 may lose its ability to form clear electrostatic latent images on the photosensitive drums 510.

Therefore, the mirrors and lenses are accommodated in a casing 430 in the preferred embodiment, as shown in FIG. 3, protecting the mirrors 410-419, fθ lenses 407, and toric lenses 420 from dust. The casing 430 is configured of a scanner frame 431 for mounting and fixing the mirrors 410-419, toric lenses 420, and the like; a cover member 432 for covering the underside (process cartridges 500 side) of the scanner frame 431; and a scanner cover 433 for covering the top side (opposite side from the process cartridges 500) of the scanner frame 431. The scanner cover 433 is formed of a synthetic resin or metal.

Figure 5:
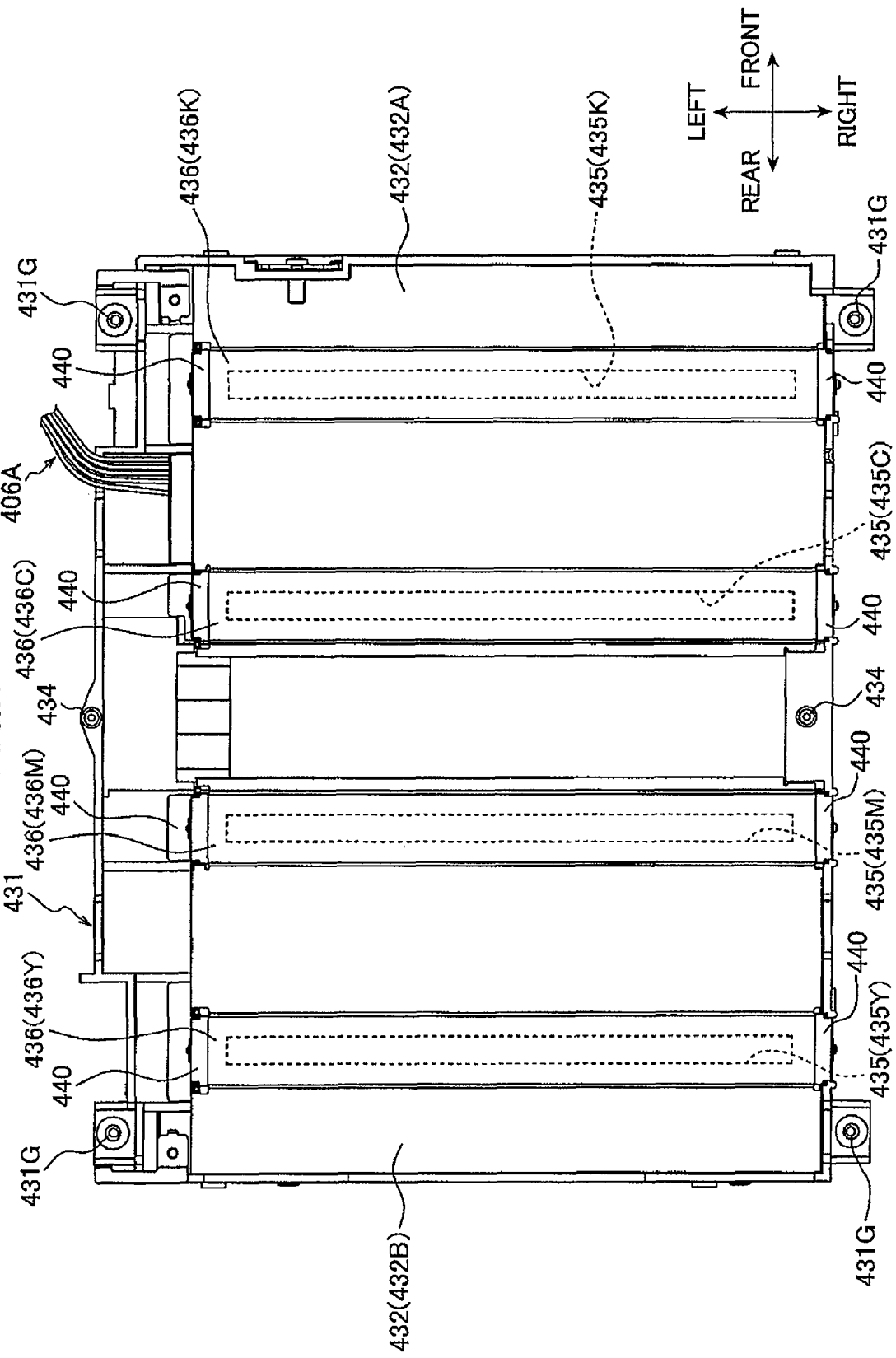
FIG. 5 is a bottom view of the scanning unit.
Figure 6:
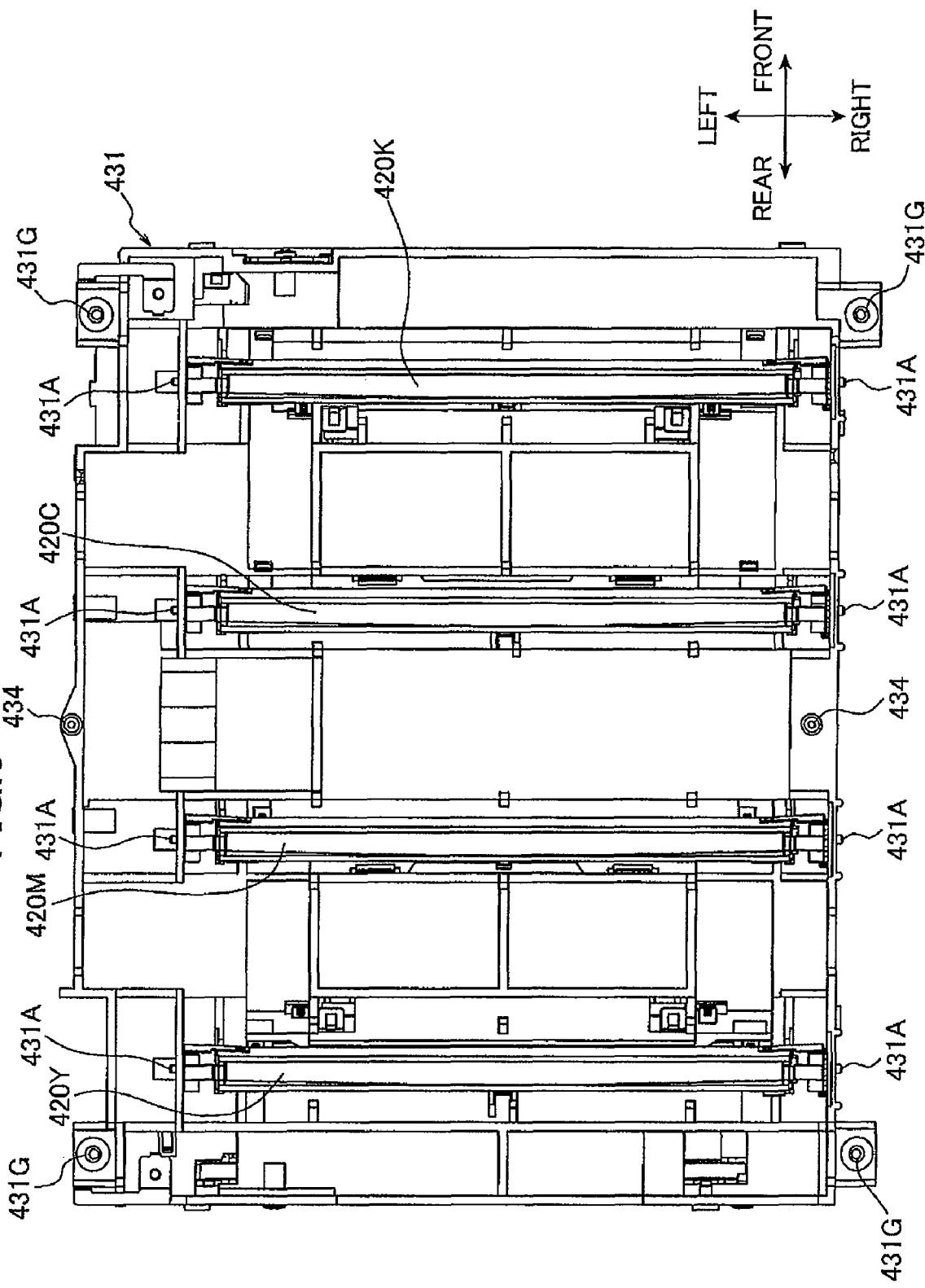
FIG. 6 is the same view in FIG. 5 when a cover member has been removed from the scanning unit.

FIG. 4 is an exploded perspective view showing the scanning unit 400 and the main frame 110. FIG. 5 shows a bottom view of the scanning unit 400. FIG. 6 shows a section of the scanning unit 400 in FIG. 8 when the cover member 432, exit hole covers 436, and cover clamps 440 have been removed from the scanning unit 400.

The scanner frame 431 is formed of a PC/ABS polymer alloy through injection molding and is filled with filler having isotropic thermal expansion properties. Protrusions 434 (boss parts) are formed on the bottom surface of the scanner frame 431 on both left and right sides thereof. The protrusions 434 function to position and fix the scanning unit 400 on the main frame 110 of the laser printer 100. The protrusions 434 are disposed along a straight line in the left-to-right direction that passes substantially through the center of the polygon mirror 406 and are positioned substantially in the front-to-rear center of the scanner frame 431.

Four corners 431G of the scanner frame 431 are pressed against the main frame 110 (see FIG. 4) by elastically deformable pressing members (not shown), such as U-shaped leaf spring clips. Since the four corners 431G are not fixed on the main frame 110, this construction allows the longitudinal ends of the scanner frame 431 to be slidingly displaced relative to the main frame 110, while the positions of the protrusions 434 relative to the main frame 110 remain unchanged.

Even when the thermal expansion of the scanner frame 431 differs greatly from that of the metal main frame 110, a great thermal stress will not be generated in the scanner frame 431 since the longitudinal ends of the scanner frame 431 are displaced relative to the main frame 110. Hence, it is possible to suppress deformation in the scanner frame 431 due to thermal stress, while preventing the center positions of the scanner frame 431 from changing relative to the main frame 110.

By reducing the amount of deviation in the focus position at which light emitted from the scanning unit 400 strikes the photosensitive drum 510, this construction can prevent problems in color registration caused by such deviations.

As shown in FIG. 3, the cover member 432 includes a first cover member 432A covering the region of the scanner frame 431 spanning from the front-to-rear center to the front side, and a second cover member 432B for covering the region spanning from the front-to-rear center to the rear side. The first and second cover members 432A and 432B are metal plate parts molded by pressing metal plates formed of SPCC (cold rolled steel).

Two exit holes 435K and 435C are formed in the first cover member 432A to allow the passage of light emitted toward the photosensitive drums 510K and 510C. Two exit holes 435M and 435Y are formed in the second cover member 432B to allow the passage of light emitted toward the photosensitive drums 510M and 510Y. Hereafter, the first and second cover members 432A and 432B will be collectively referred to as "cover members 432," while the four exit holes 435K, 435C, 435M, and 435Y will be collectively referred to as "exit holes 435."

By forming a plurality of the exit holes 435 in a single cover member 432, rather than providing a cover member 432 for each of the exit holes 435, the number of cover members 432 can be reduced, reducing the overall number of parts in the scanning unit 400.

The exit holes 435 are sealed by exit hole covers 436K, 436C, 436M, and 436Y (hereinafter collectively referred to as "exit hole covers 436") configured of a light transmissible material (glass or transparent acrylic in the preferred embodiment). The exit hole covers 436 are provided on the outer side of the casing 430 (see FIG. 9). In other words, a bottom surface 436A of the exit hole cover 436 is positioned lower than an outer surface 432A of the casing 430 (the cover member 432). As shown in FIG. 3, all bottom surfaces 436A are positioned in substantially the same plane.

By positioning the bottom surfaces 436A of the exit hole covers 436 lower than the outer surface 430A of the casing 430 in this way, the exit hole covers 436 are easier to clean than when the bottom surfaces 436A of the exit hole covers 436 are positioned inside (higher than) the outer surface 430A of the casing 430, thereby maintaining the quality of images formed on paper for a longer period of time.

Further, since the bottom surfaces 436A of the exit hole covers 436 are positioned substantially in the same plane, the plurality of exit hole covers 436 can be easily cleaned at the same time.

As shown in FIG. 9, a portion of the toric lenses 420 is positioned inside the exit holes 435, the toric lenses 420 being the optical members positioned last in the optical path among the optical members (i.e., the mirrors 410-419, the fθ lenses 407, and the toric lenses 420) for focusing light emitted from the light sources 403 on the photosensitive drums 510.

In other words, in the preferred embodiment, the toric lenses 420 are fixed in the casing 430 so that ends of the toric lenses 420 positioned on the exit hole cover 436 side are positioned closer to the exit hole covers 436 than a surface 430B on the inside of the cover members 432 around the exit holes 435.

Positioning at least part of the toric lenses 420 inside the exit holes 435 reduces the distance between the scanning unit 400 and the photosensitive drums 510, thereby reducing the distance between the toric lenses 420 and the photosensitive drums 510. By reducing the distance between the toric lenses 420 and photosensitive drums 510, it is possible to reduce the image magnification, thereby preventing the effects of deviations in the light sources 403 and the like from being amplified and, hence, preventing large deviations in the positions at which the light strikes the photosensitive drums 510. Accordingly, this construction improves the quality of images formed on the paper, while increasing the distance between the exit hole covers 436 and the photosensitive drums 510, enabling the space between the exit hole covers 436 and photosensitive drums 510 to be used effectively.

Figure 7:
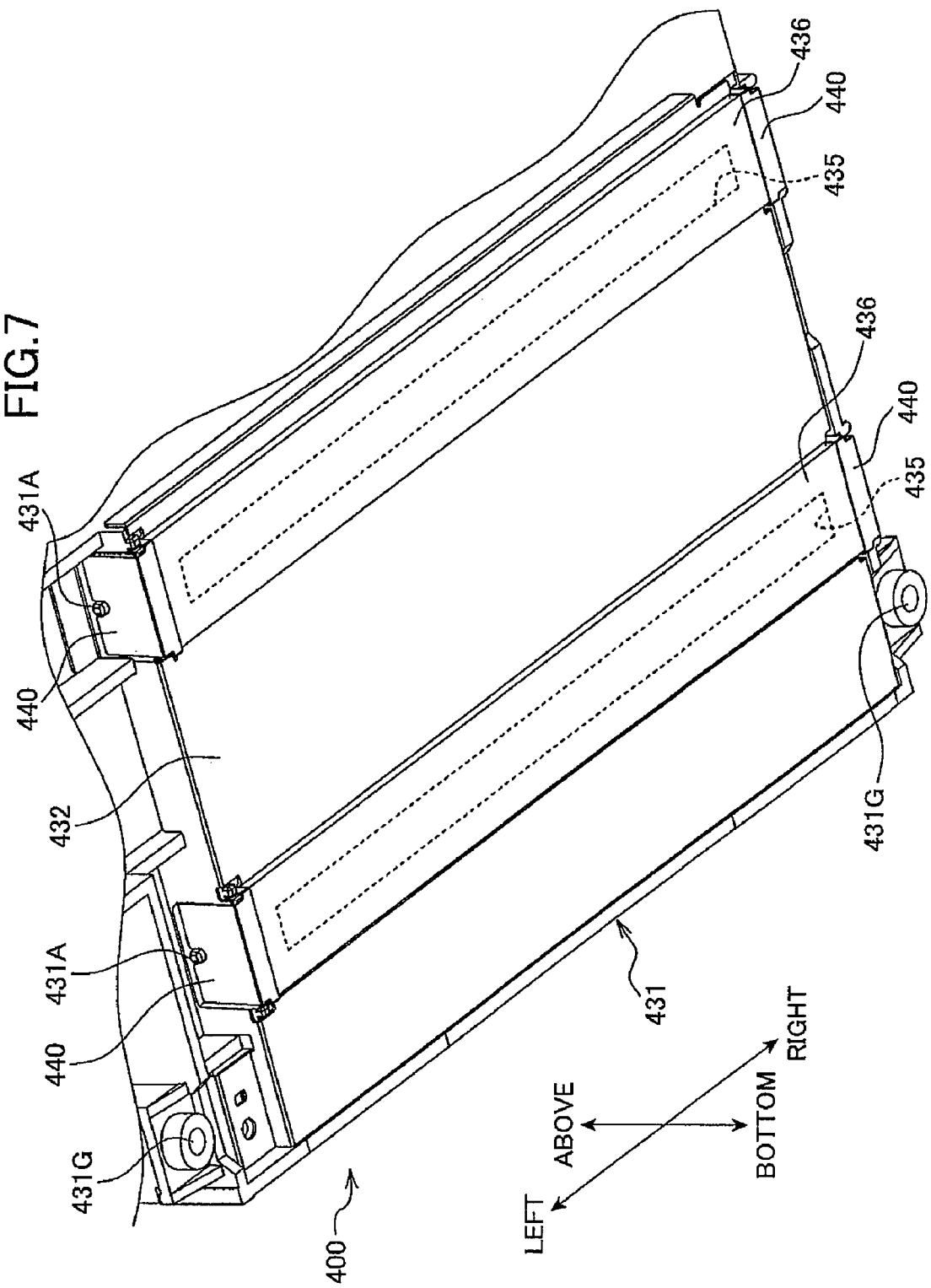
FIG. 7 is a perspective view showing a portion of the scanning unit from the bottom.

FIG. 7 is a perspective view showing a portion of the scanning unit 400 from the bottom. As shown in FIG. 7, the exit hole covers 436 are formed in strips extending in the main scanning direction (left-to-right direction in the preferred embodiment) of the laser beams. As shown in FIG. 9, the exit hole covers 436 are fitted into recessed parts 432D formed in the peripheral edge portion of the exit holes 435 for positioning the exit hole covers 436 relative to the cover members 432. The cover clamps 440 (FIG. 5) press the longitudinal ends of the exit hole covers 436 against the cover members 432, fixing the exit hole covers 436 on the cover members 432.

Figure 8:
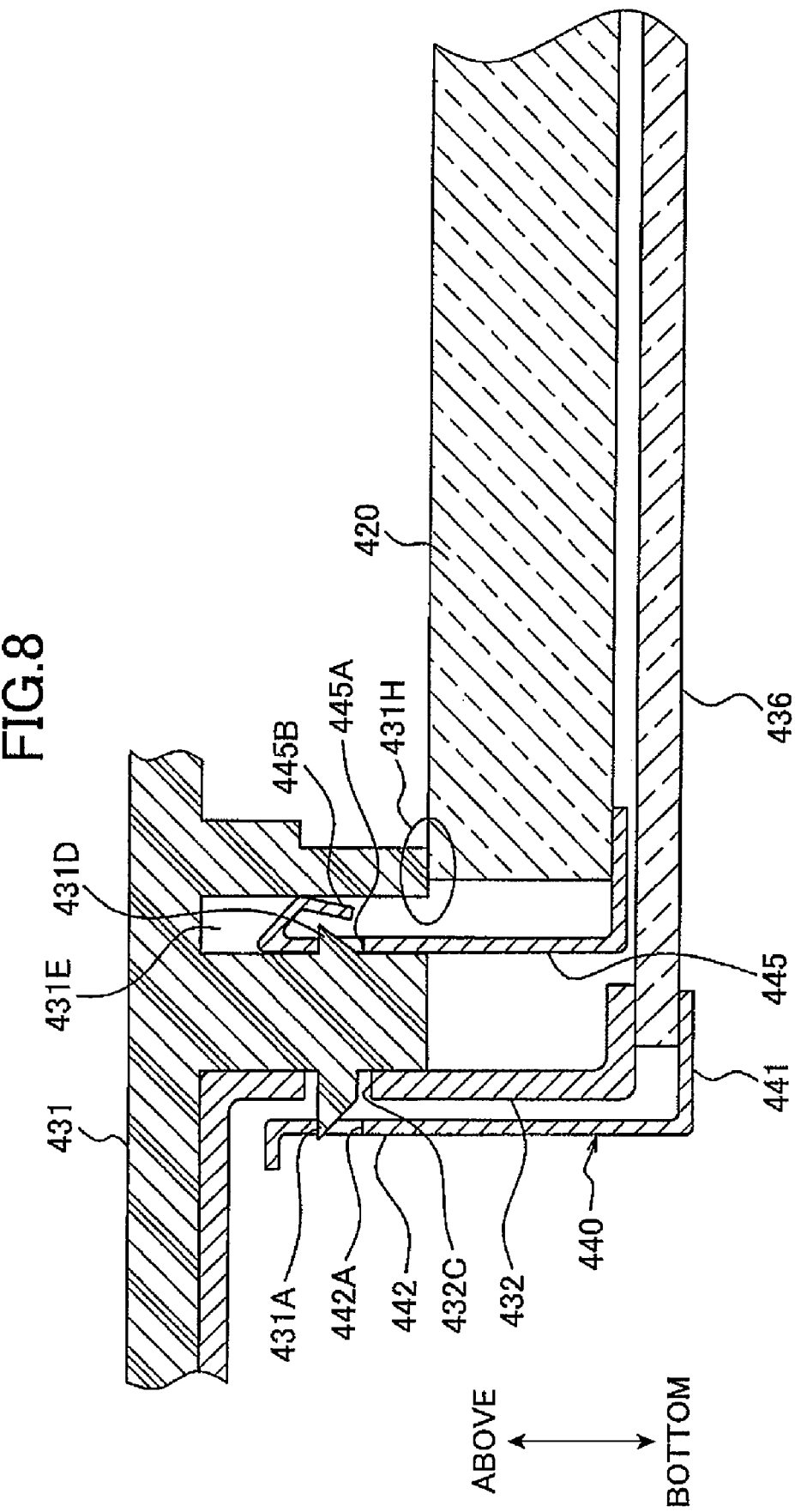
FIG. 8 is a schematic cross-sectional view showing an exit hole cover and a cover clamp according to the preferred embodiment.

FIG. 8 is a schematic cross-sectional view showing the exit hole cover 436 and the cover clamp 440. As shown in FIG. 8, the cover clamp 440 is substantially L-shaped and configured of a first plate part 441 covering an end part of the exit hole cover 436, and a second plate part 442 extending in a direction orthogonal to the first plate part 441. An engaging hole 442A is formed in the second plate part 442, and an engaging protrusion 431A is formed on the scanner frame 431 for fitting into the engaging hole 442A. By engaging the engaging protrusions 431A in the engaging holes 442A, the cover clamps 440 are fixed to the scanner frame 431.

The cover clamp 440 is configured of an L-shaped leaf spring. Before mounting the cover clamp 440 on the casing 430, the angle formed by the first and second plate parts 441 and 442 is slightly less than 90 degrees.

Therefore, when the cover clamp 440 is mounted on the casing 430 by fitting the engaging protrusion 431A in the engaging hole 442A, the cover clamp 440 deforms elastically so that the first and second plate parts 441 and 442 form an angle of 90 degrees. Accordingly, when the exit hole cover 436 is fixed to the casing 430, the elastic force (restoring force) generated by the cover clamp 440 presses against the cover member 432.

An engaging hole 432C is also formed in the cover member 432 for engaging with the engaging protrusion 431A (i.e., the engaging protrusion 431A is fitted into the engaging hole 432C. Hence, the cover member 432 is positioned relative to the scanner frame 431 by engaging the engaging protrusion 431A and engaging hole 432C. When the engaging protrusion 431A is engaged in the engaging hole 432C, the cover clamp 440 presses the cover member 432 against the exit hole cover 436 and the scanner frame 431, thereby fixing the cover member 432 and exit hole cover 436 on the scanner frame 431 with pressure.

Constructing the cover clamps 440 to press the exit hole cover 436 against the casing 430 on both ends of the exit hole cover 436 in the main scanning direction not only prevents the cover clamps 440 from obstructing the optical path of the laser beam during a scanning operation, but also prevents the cover clamps 440 from interfering with cleaning of the exit hole cover 436. Hence, this construction facilitates cleaning of the exit hole covers 436.

Further, since the cover clamps 440 are substantially L-shaped with the section on the process cartridge 500 side formed as a flat surface with no protrusions, the cover clamps 440 do not protrude toward the process cartridge 500 side. Therefore, the size of the process cartridge 500 (toner accommodating section 530) can be increased to increase toner capacity, without interference between the process cartridge 500 and the cover clamps 440. The cover clamps 440 also do not interfere when mounting the process cartridge 500.

As shown in FIG. 8, lens clamps 445 are provided for pressing and fixing the toric lens 420 against the scanner frame 431. As with the cover clamp 440, the lens clamp 445 is configured of an L-shaped leaf spring member.

More specifically, an engaging hole 445A is formed in the lens clamp 445, and a spring part 445B is formed on the lens clamp 445. The engaging hole 445A fits over (engages with) an engaging protrusion 431D formed on the scanner frame 431 and fits into a recessed part 431E formed in the scanner frame 431. At this time, the spring part 445B generates an elastic force for pressing the lens clamp 445 toward the base of the engaging protrusion 431D.

Hence, the lens clamp 445 is positioned relative to the scanner frame 431 when the engaging protrusion 431D is fitted into the engaging hole 445A and is firmly fixed relative to the scanner frame 431 by the elastic force (pressing force) generated by the spring part 445B. At the same time, the lens clamp 445 presses the toric lens 420 against the scanner frame 431 so that the toric lens 420 contacts a region 431H of the scanner frame 431, thereby fixing the position of the toric lens 420 in the thickness direction (vertical direction) of the scanner frame 431.

As shown in FIG. 5, an electric harness 406A is arranged in an area of the casing 430 corresponding to a region in which the cover member 432 is provided. The electric harness 406A supplies a drive current and control signals for controlling an electric motor that rotates the polygon mirror 406. Accordingly, the metal cover member 432 shields a magnetic field induced by current flowing through the electric harness 406A, preventing the magnetic field from leaking outside of the casing 430.

By forming the cover member 432 of metal rather than a synthetic resin, the walls of the cover member 432 can be made thinner while maintaining the same stiffness as that of a cover member 432 formed of resin. Hence, this construction does not contribute to an increased size of the laser printer 100 and can maintain a prescribed gap between the scanning unit 400 and process cartridges 500.

Further, forming the cover member 432 of press-molded metal plate parts improves the productivity for the cover member 432 and reduces the base manufacturing costs of the scanning unit 400.

FIG. 10A is an enlarged view of parts A shown in FIG. 2. FIG. 10B is a cross-sectional view along a line XB-XB in FIG. 10A. FIG. 10C is a cross-sectional view along a line XC-XC in FIG. 10A. As shown in FIG. 10A, wall parts 413G connected to the scanner frame 431 are provided between the fθ lens 407 and polygon mirror 406 (FIG. 2) for fixing the fθ lens 407 to the scanner frame 431. The fθ lens 407 is fixed to the wall parts 413G by both ends in the main scanning direction of the laser beam.

In the preferred embodiment, clips 407C forming three sides of a rectangle in cross section are elastically deformed to fit over the fθ lens 407 and wall part 413G, thus fixing the fθ lens 407 to the wall part 413G.

As shown in FIG. 10A, a bridge part 413K bridges the two clips 407C. As shown in FIG. 10B, an optical path opening 413H is formed between the scanner frame 431 and the bridge part 413k. As shown in FIGS. 3 and 10A to 10C, a through-hole 413L is formed in the scanner frame 431 at an opposing position to the bridge part 413K for constructing an optical path leading to the exit hole 435.

In the preferred embodiment, the wall part 413G, bridge part 413K, and scanner frame 431 are integrally formed by a molding process.

Thus, the bridge part 413K provided between the wall parts 413G increases the bending stiffness of the scanner frame 431, which includes the wall part 413G for fixing the fθ lens 407. Therefore, this construction prevents a decrease in stiffness of the scanner frame 431 when the through-hole 413L is formed on the side of the optical path opening 413H opposite the bridge part 413K.

Normally, the mirrors, including the polygon mirror and mirrors, and the lenses, including the toric lenses, are accommodated in the casing for protection from dust particles. However, since the laser printer deflects and scans light beams emitted from the light sources by rotating the polygon mirror, regardless of whether the laser printer is a color or monochrome printer, the rotating motion of the polygon mirror agitates air in the casing, producing airflow. Consequently, air outside the casing is drawn into the casing through gaps between the exit hole cover and casing.

Of the gaps between the exit hole cover and casing in fluid communication with the region outside the casing, some gaps are too small to allow the passage of dust particles. These gaps act as a filter and trap and accumulate dust particles therein.

Figure 11A:
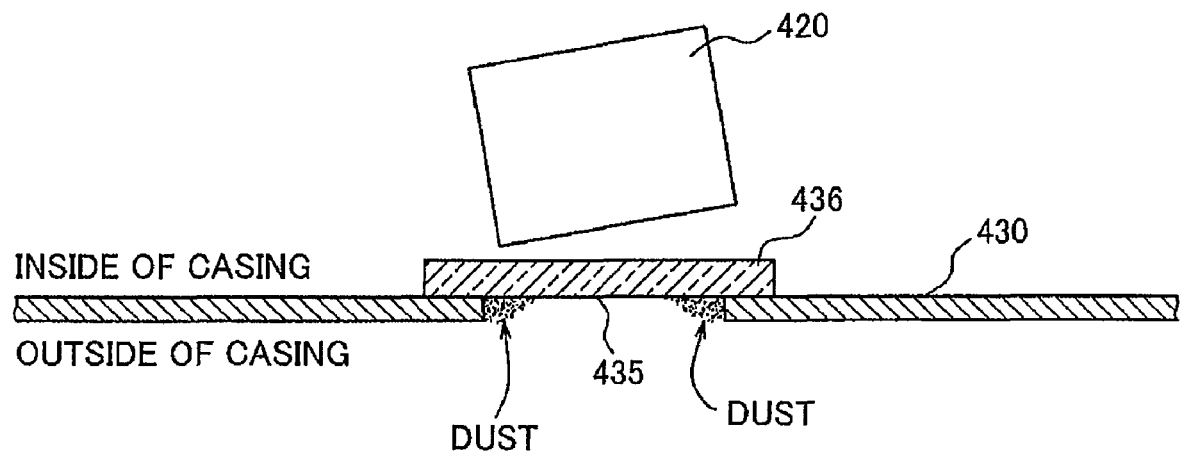
FIG. 11A is a cross-sectional view of a scanning unit having a structure different from that in the preferred embodiment.

At this time, if the exit hole cover 436 is disposed on the inside of the casing 430 with the exit hole 435 exposed on the outside of the casing, as shown in FIG. 11A, dust particles that cannot pass through gaps between the exit hole cover 436 and the casing 430 accumulate in edges of the exit hole 435, obstructing the same.

However, since the exit hole cover 436 is provided in the outside of the casing 430 in the preferred embodiment, the exit hole 435 is not exposed to the outside of the casing 430, but is entirely covered by the exit hole cover 436.

Figure 11B:
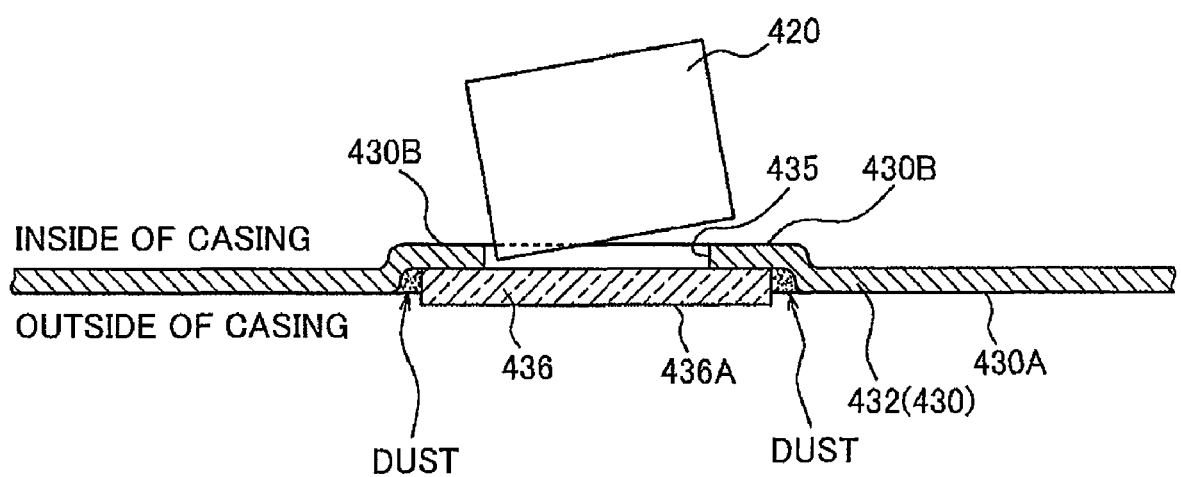
FIG. 11B is a cross-sectional view illustrating a feature of the scanning unit according to the preferred embodiment.

Therefore, as illustrated in FIG. 11B, dust particles that cannot pass through gaps between the exit hole cover 436 and the casing 430 accumulate at outer edge regions of the exit hole cover 436 rather than in edges of the exit hole 435. Therefore, the structure according to the preferred embodiment prevents the accumulation of dust particles that are unable to pass through gaps between the exit hole cover 436 and the casing 430 from obscuring the exit hole 435, thereby reducing the frequency of cleaning (maintenance frequency) required for the exit hole cover 436 and improving user-friendliness of the laser printer 100. Further, the scanning unit 400 can maintain the quality of images formed on a recording medium over a long period of time.

When manufacturing the casing 430 by an injection molding method or other molding process, restrictions in the manufacturing process (related to removing the molded part) may require that an opening be formed in a region of the casing 430 opposing the photosensitive drum 510. Since the casing 430 is configured of a main casing part (the scanner frame 431 and scanner cover 433) and the cover member 432 in the preferred embodiment, the opening provided in the main casing part as a requirement of the manufacturing process can be sealed with the cover member 432, thereby reliably protecting the light sources 403, polygon mirror 406, mirrors 410-419, and the like from dust particles. Further, by molding the exit hole cover 436 from a metal plate part according to a pressing process, productivity of the exit hole cover 436 can be improved, thereby reducing manufacturing costs for the scanning unit 400.

Next, the configuration for mounting and fixing the mirrors 410-419 to the scanner frame 431 will be described, referring to FIGS. 12 to 14B. Light emitted from the light sources 403 follows optical paths that are bent by the mirrors 410-419 before the laser beam reaches the toric lenses 420. Accordingly, if the mounted angles of the mirrors 410-419 relative to the scanner frame 431 are inexact, the laser beams will not be suitably focused on the photosensitive drums 510.

Hence, even if the angles of the mirrors 410-419 are adjusted appropriately when assembled, if the mounted angles were later to change, the light beams would not be focused appropriately on the photosensitive drums 510 for forming images reliably on paper. Consequently, the quality of the images formed on the paper would decline.

This problem is resolved in the preferred embodiment by fixing the mirrors 410-419 to the scanner frame 431 according to the following construction. Since the construction for fixing the mirrors 410-419 to the scanner frame 431 is the same for each mirror, the construction for assembling the mirror 411 will be used as an example of the assembly structure in the preferred embodiment.

Figure 12:
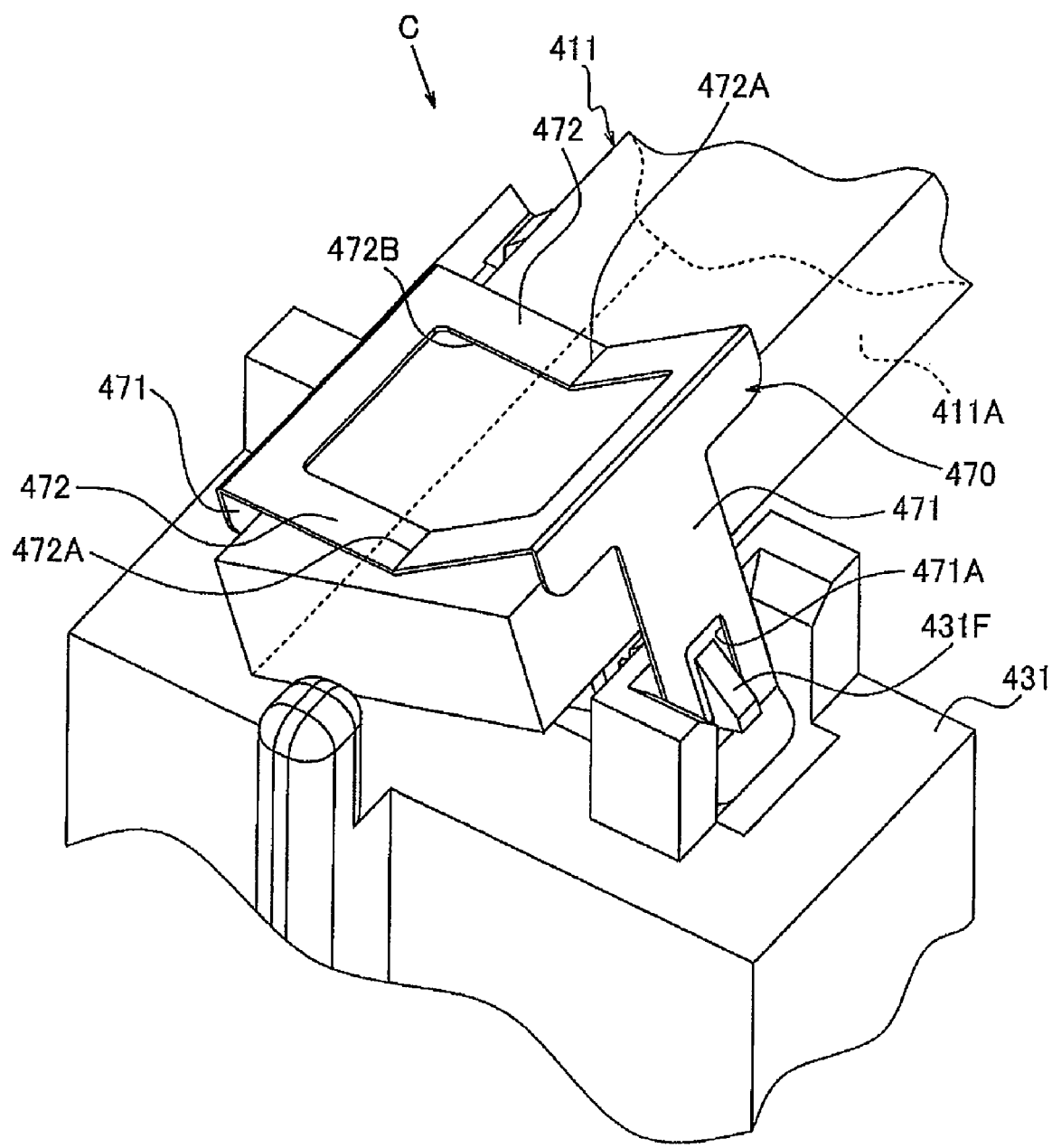
FIG. 12 is a perspective view showing a mirror mounted on the scanner frame according to the preferred embodiment.
Figure 13:
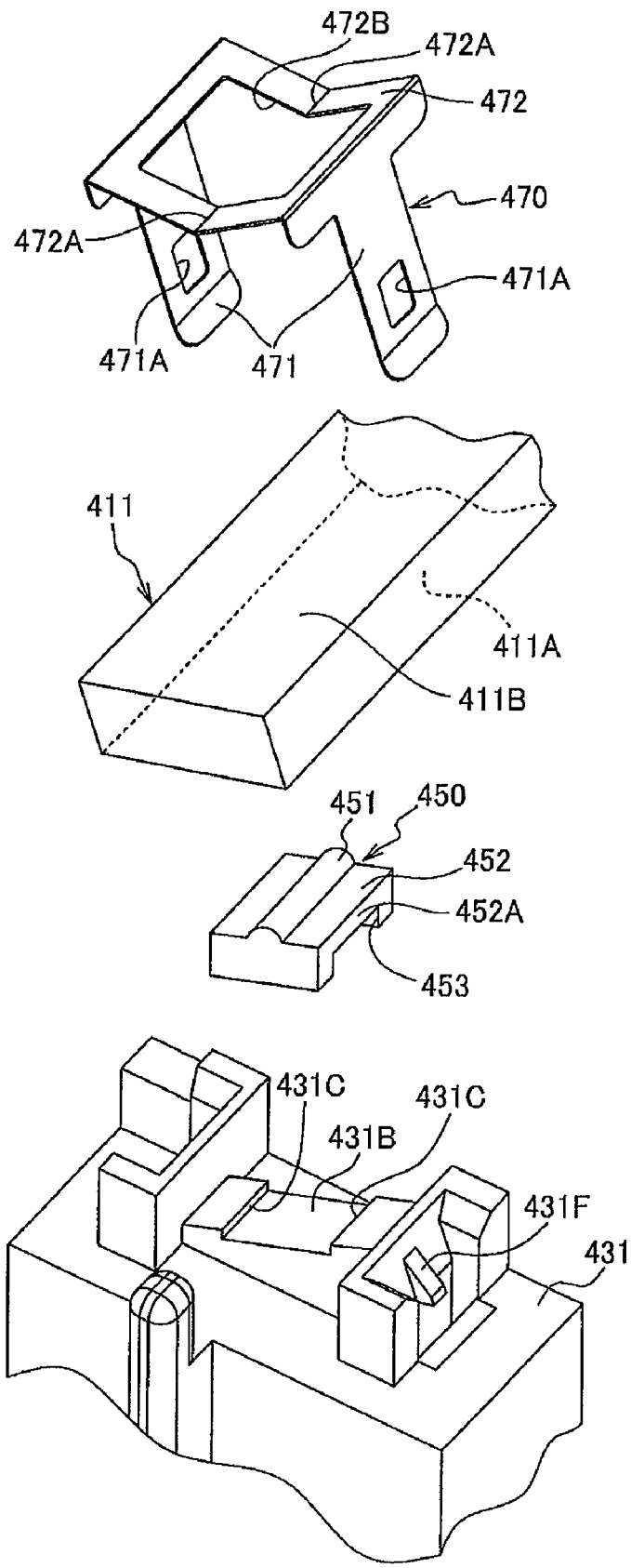
FIG. 13 is an exploded cross-sectional view of the mirror and scanning frame in FIG. 12.

FIG. 12 is a perspective view showing the mirror 411 mounted on the scanner frame 431. FIG. 13 is an exploded cross-sectional view of the mirror 411 and scanning frame 431 in FIG. 12. As shown in FIGS. 12 and 13, the mirror 411 is formed of a glass plate extending as a strip in the scanning direction of the laser beam. A reflecting surface (reflecting film) 411A for reflecting light is formed through vapor deposition of aluminum or another metal on a side surface of the glass plate on which light is incident. Metal is not deposited on the longitudinal ends of the mirror 411 to which mirror clamps 470 described later are attached, allowing light to pass therethrough.

FIG. 14A is a view of the mirror 411 and scanning frame 431 from the viewpoint indicated by an arrow C in FIG. 12. FIG. 14B is a cross-sectional view along a line XIVB-XIVB shown in FIG. 14A. As shown in FIGS. 12 and 14B, the mirror clamps 470 fix the mirror 411 on the scanner frame 431, while pressing the mirror 411 toward the scanner frame 431. The mirror clamp 470 positions the mirror 411 relative to the scanner frame 431 on a seating member 450.

As shown in FIG. 14A, the seating member 450 is disposed between the scanner frame 431 and the mirror 411 on each longitudinal end thereof. As shown in FIG. 14B, the seating member 450 has a protruding support part 451, and a plate part 452 that are integrally formed of aluminum or another metal. The protruding support part 451 serves as a reference for adjusting the mounted angle of the mirror 411. The protruding support part 451 protrudes from the mirror 411 side of the plate part 452 and contacts the reflecting surface 411A of the mirror 411 with the distal end thereof.

As shown in FIG. 13, the protruding support part 451 is a protrusion extending in the longitudinal direction of the mirror 411. As shown in FIG. 14A, the region of contact between the protruding support part 451 and reflecting surface 411A of the mirror 411 is an extension of a scanning path L1 of the laser beam.

As shown in FIG. 13, a groove 453 is formed in a bottom surface of the plate part 452 extending in a direction orthogonal to the longitudinal direction of the mirror 411. By fitting a protruding part 431B formed on the scanner frame 431 in the groove 453, the position of the seating member 450 is fixed in the longitudinal direction of the mirror 411.

Side parts 452A of the plate part 452 contact step parts 431C formed on the protruding part 431B to position the seating member 450 in a direction orthogonal to the longitudinal direction of the mirror 411.

As shown in FIG. 14B, spacers 460 are provided between the mirror 411 and plate part 452 on both sides of the protruding support part 451 for maintaining the mounted angle of the mirror 411 relative to the scanner frame 431. The spacers 460 are formed of a photocurable resin (a UV resin, such as an epoxy resin, in the preferred embodiment) that hardens when exposed to light of a wavelength within a prescribed range.

As shown in FIG. 13, the mirror clamp 470 is formed of a substantially three-sided clip including two engaging plate parts 471, and a linking part 472 linking the two engaging plate parts 471. An engaging hole 471A is formed in each of the engaging plate parts 471. The engaging holes 471A are fitted over (engaged with) engaging protrusions 431F formed on the scanner frame 431.

The mirror clamp 470 is placed over both widthwise ends of the mirror 411 so that the linking parts 472 contact a surface 411B of the mirror 411 on the side opposite the reflecting surface 411A. The mirror clamp 470 presses the mirror 411 toward the scanner frame 431 and fixes the mirror 411 relative to the scanner frame 431.

As shown in FIG. 14B, when viewed along the longitudinal direction of the mirror 411, the linking parts 472 are bowed inward toward the mirror 411. Vertices 472A of the linking part 472 in this bowed section contact the mirror 411, by which contact the mirror clamp 470 applies pressure to the mirror 411.

As shown in FIG. 14A, the seating member 450 and mirror clamp 470 are disposed such that the point at which the vertices 472A contact and apply pressure to the mirror 411 and a support point 451A at which the protruding support part 451 contacts the mirror 411 are positioned along an extension of the scanning path L1 for light incident on the mirror 411 when projected on a plane orthogonal to the thickness direction of the mirror 411. Further, the vertices 472A are positioned on both sides of the support point 451A with respect to the scanning direction of the laser beam.

A rectangular opening 472B is formed in at least a region of the mirror clamp 470 corresponding to the spacers 460 (the linking parts 472 in the preferred embodiment). The opening 472B allows the light to cure the photocurable resin (spacers 460) thorough the longitudinal end of the mirror 411 on which the metal is not deposited.

As described above, the spacers 460 are formed of a photocurable resin in the preferred embodiment. Therefore, after adjusting the mirrors 410-419 to the prescribed mounted angles, light is irradiated on the spacers 460 to set the spacers 460 for maintaining the mirrors at the adjusted angles.

Further, the mirrors 410-419 can be set to desired angles by rotating (pivoting) the mirrors about the respective protruding support parts 451, thereby reliably adjusting the mirrors to appropriate angles.

Further, since the spacers 460 can be easily deformed to follow (conform to) the contact surfaces of the mirrors 410-419 prior to curing, light can be irradiated on the spacers 460 in this deformed state to harden the spacers 460. Accordingly, there is no need to consider the surface precision of the spacers 460 or the mirrors 410-419.

Further, since the cured spacers 460 continue to maintain their shape (seating surface) for holding the mirrors in the prescribed angles set when mounting the mirrors, if the scanning unit 400 is dismantled for cleaning the mirrors 410-419, the mirrors 410-419 need only be mounted in contact with the already cured spacers 460 when reassembling the scanning unit 400. In other words, the mirrors 410-419 can be remounted on the scanner frame 431 at the appropriate mounted angles without readjusting the angles after maintenance.

Therefore, the scanning unit 400 according to the preferred embodiment facilitates reassembly (maintenance) operations and can easily maintain the mounted angles of the mirrors 410-419 at the appropriate angle.

Further, at least the region of the mirrors 410-419 opposing the spacers 460 allows light to pass for curing the photocurable resin of the spacers 460. Accordingly, the mirrors 410-419 do not impede light irradiated onto the spacers 460, thereby avoiding such interference.

Further, the protruding support part 451 is provided on the seating member 450 disposed between the scanner frame 431 and the respective mirror 410-419, and the spacers 460 disposed between the seating member 450 and the respective mirror 410-419 preserve the mounted angle of the respective mirror 410-419. Therefore, the mirrors 410-419 can be fixed on the scanner frame 431 via the seating members 450.

Accordingly, if the photocurable resin (spacers 460) functions as an adhesive that bonds each of the mirrors 410-419 to the respective seating member 450 forming a single unit, for example, each of the mirrors 410-419 and the respective seating member 450 can be treated as a single unit in which the mounted angle of the mirror 410-419 is fixed. Hence, the mirrors 410-419 can easily be removed from the scanner frame 431 and remounted on the scanner frame 431 with the respective seating members 450 as a unit when reassembling the scanning unit 400, without having to readjust the mounted angle of the mirrors 410-419. Therefore, the scanning unit 400 according to the preferred embodiment further facilitates reassembly (maintenance) operations.

Further, since photocurable resin normally bonds well with metal, forming the seating member 450 with metal, as in the preferred embodiment, reliably ensures that each of the mirrors 410-419 and the respective seating member 450 can be bonded together as a single unit.

However, the position of the seating member 450 in the longitudinal direction of the mirror 411 is fixed by fitting the groove 453 of the seating member 450 over the protruding part 431B. Similarly, the position of the seating member 450 in the direction orthogonal to the longitudinal direction of the mirror 411 is fixed by restricting both ends of the seating member 450 in the extended direction of the groove 453 with the step parts 431C formed on the protruding part 431B.

However, it is not possible to prevent the seating member 450 from coming off the scanner frame. 431 simply by inserting the protruding part 431B into the groove 453. Further, since the spacers 460 are formed of a photocurable resin, although the photocurable resin can be expected to function as an adhesive for bonding the seating member 450 to the mirror 411, it is unlikely that the mirror 411 and seating member 450 will be firmly fixed together as a single unit with only the spacers 460.

Therefore, the mirror clamps 470 press the mirrors 410-419 toward the scanner frame 431, reliably fixing the units configured of the mirrors 410-419 and their respective seating members 450 on the scanner frame 431.

Further, the opening 472B through which light can be transmitted for hardening the photocurable resin is provided in at least the region of the mirror clamps 470 corresponding to the spacers 460. Therefore, not only can the units configured of the mirrors 410-419 and their respective seating members 450 be fixed to the scanner frame 431 reliably, but also this configuration prevents the mirror clamps 470 from interfering with light irradiated onto the spacers 460.

Displacement of the light beam relative to variations in the mounted angle of the mirrors 410-419 increases in regions farther away from the rotating (pivoting) support points of the mirrors. If the light beam is incident on a region of the mirrors 410-419 away from the rotating support point thereof, adjustments in the mounted angles of the mirrors 410-419 would greatly change the length of the optical path.

However, since the protruding support parts 451 contact the reflecting surfaces 411A of the mirrors 410-419 in an area positioned along an extension of the scanning path L1 of the laser beam in the preferred embodiment, the mounted angles of the mirrors 410-419 are adjusted by rotating (pivoting) the mirrors 410-419 about a region positioned on the extension of the scanning path L1. Therefore, the present invention prevents large changes in the length of the optical path when adjusting the mounted angle of the mirrors 410-419.

Further, the vertices 472A at which the mirror clamps 470 contact and apply pressure to the mirrors 410-419 and the support points 451A at which the protruding support parts 451 contact the mirrors 410-419 are aligned in a direction parallel to the scanning path L1 when the points are projected onto a plane orthogonal to the thickness direction of the mirrors 410-419. Accordingly, the vector of force applied to the vertices 472A and the vector of reaction force generated at the support point 451A cancel each other so that a moment for twisting the mirrors 410-419 is not generated in the same.

Since it is possible to prevent twisting deformation in the mirrors 410-419, the light beam can be guided to the photosensitive drums 510 reliably.

Further, since the vertices 472A of the linking parts 472 contact and apply pressure to the mirrors 410-419 on either side of the support points 451A contacting the mirrors 410-419 in a direction parallel to the scanning direction of the laser beam, the pressing force of the mirror clamps 470 can be applied uniformly (symmetrically) about the support point at which the protruding support parts 451 contact the mirrors 410-419. Therefore, this construction can prevent the pressure applied by the mirror clamps 470 from bending or deforming the mirrors 410-419 unevenly, thereby reliably guiding light beams to the photosensitive drums 510.

As shown in FIG. 3, the scanning unit 400 in a color laser printer 100 has mirrors 410-419 of a number at least equal to the number of photosensitive drums 510. If the mounted angles of the mirrors 410-419 are inexact, the paths of light beams irradiated onto the photosensitive drums 510 are not parallel to the photosensitive drums 510, but rather slanted or curved, making it impossible to guide the laser beams to prescribed positions on the photosensitive drums 510. As a result, the quality of images formed on the paper suffers.

A color laser printer 100 forms color images by transferring toner images carried on photosensitive drums 510 provided for each of the colors cyan, magenta, yellow, and black, superimposing the toner images on paper. Hence, if the laser beams irradiated onto the photosensitive drums 510 follow slanted or curved trajectories, the superimposed images in each color will not be properly registered, resulting in a remarkable decline in image quality.

In other words, with a color laser printer 100 it is more important to adjust and maintain the mounted angles of the mirrors 410-419 with high precision than with a single-color laser printer. Since the mounted angles of the mirrors 410-419 can be adjusted and maintained with high precision when using the scanning unit 400 according to the preferred embodiment, the color laser printer 100 using the scanning unit 400 can form high quality color images.

In the tandem color laser printer 100 shown in FIG. 3, a plurality of the photosensitive drums 510 are arranged in series along the paper-conveying direction, and laser beams are irradiated from a plurality of locations toward each of the photosensitive drums 510. Since each of the laser beams must be focused on the respective photosensitive drum 510 with great accuracy, it is particularly effective to use the scanning unit 400 according to the preferred embodiment in this laser printer 100 in order to adjust and maintain the mounted angles of the mirrors 410-419 with accuracy.

Second Embodiment

Figure 16:
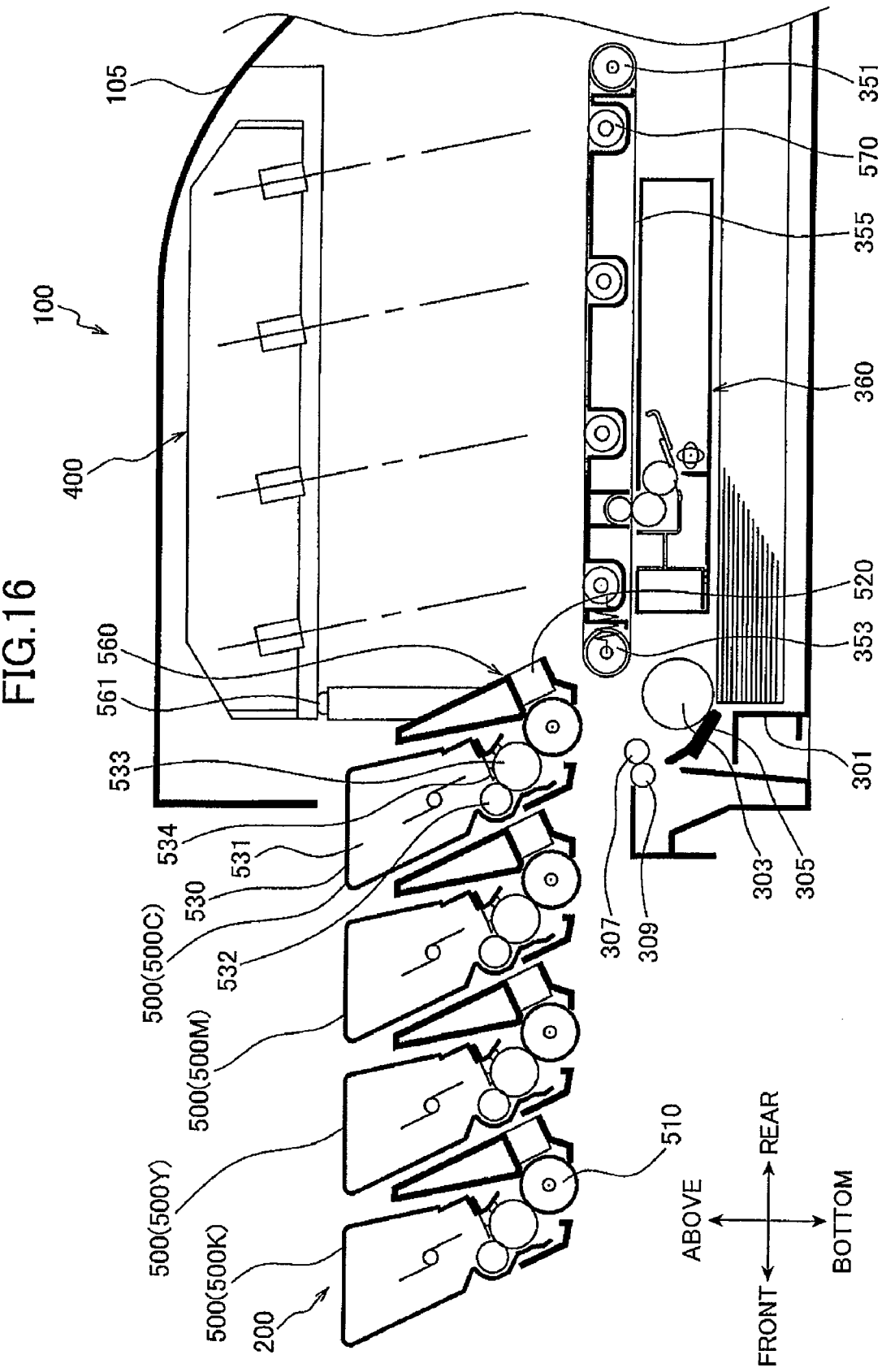
FIG. 16 is a side cross-sectional view showing an operational feature of the laser printer according to the second embodiment.

In the laser printer 100 according to a second embodiment shown in FIG. 15, a cleaning pad 561 is provided on the casing 560 of the process cartridge 500 for cleaning the exit hole covers 436. Accordingly, when pulling the casing 560 out of the laser printer 100 to replace the process cartridges 500, for example, the cleaning pad 561 provided on the casing 560 cleans the four exit hole covers 436 while moving together with the casing 560, as shown in FIG. 16.

Hence, in the preferred embodiment, the exit hole covers 436 can be simultaneously cleaned when moving the casing 560 to remove or insert the process cartridges 500, thereby facilitating cleaning of the exit hole covers 436.

Third Embodiment

In the preferred embodiments described above, the protruding support part 451 formed on the seating member 450 contacts the reflecting surface 411A of the mirror 411 at substantially the widthwise center of the mirror (the center point in a direction orthogonal to the longitudinal direction and thickness direction), that is, along an extension of the scanning path L1. However, in the third embodiment shown in FIG. 17, the protruding support part 451 is positioned to contact the reflecting surface 411A of the mirror near one widthwise end thereof, while a single spacer 460 is disposed on the other widthwise end.

Fourth Embodiment

Figure 18A:
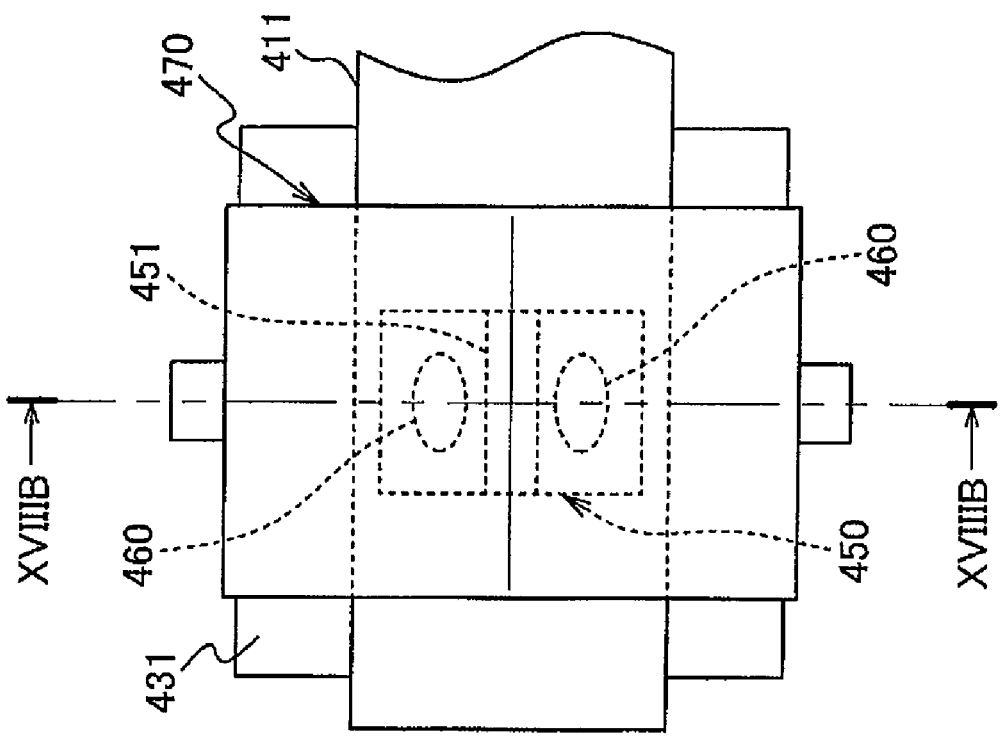
FIG. 18A is a plan view showing a mirror mounted on the scanner frame according to a fourth embodiment of the present invention.
Figure 18B:
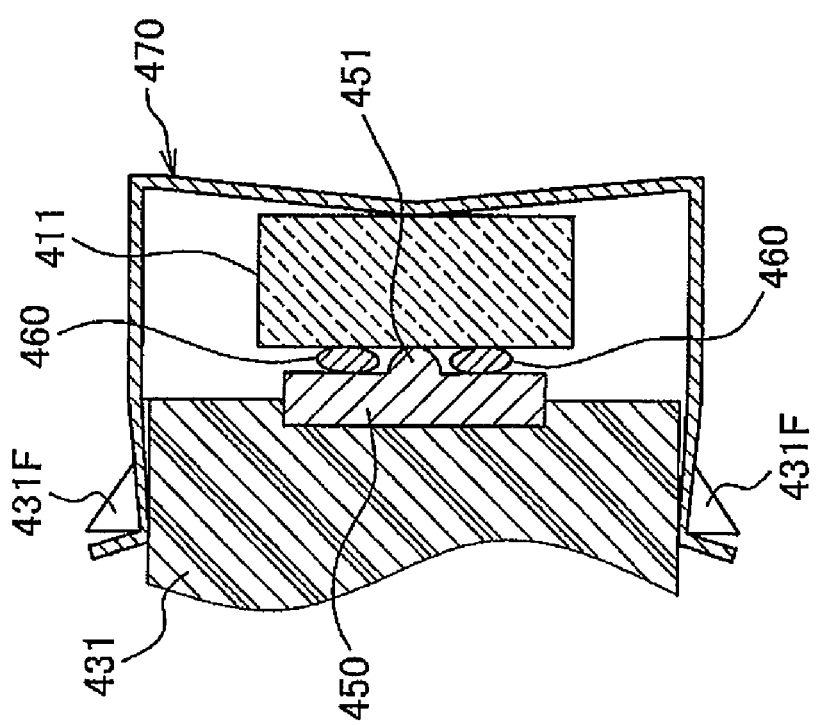
FIG. 18B is a cross-sectional view along a line XVIIIB-XVIIIB shown in FIG. 18A.

In the embodiments described above, the mirror clamp 470 is formed of a metal, and an opening 472B is formed in the mirror clamp 470 for allowing the passage of light used to cure the spacers 460. However, in the fourth embodiment shown in FIGS. 18A and 18B, at least the linking parts 472 of the mirror clamp 470 are formed of a transparent material (such as a polycarbonate or other resin), thereby eliminating the opening 472B.

Variations of the Embodiments

While the invention has been described in detail with reference to the specific embodiment thereof, it would be apparent to those skilled in the art that various changes and modifications may be made therein without departing from the spirit of the invention.

For example, in the preferred embodiments described above, the optical scanner according to the present invention is applied to a scanning unit 400 in a tandem color laser printer. However, the present invention is not limited to this configuration, but may be applied to a scanning unit 400 for a single-color laser printer, for example.

Further, the protruding support part 451 is provided on the seating member 450 in the preferred embodiments described above, but the present invention is not limited to this configuration. For example, the protruding support part 451 may be provided directly on the scanner frame 431, eliminating the seating member 450. However, if the mirrors 410-419 were to be directly mounted on the scanner frame 431 without using the seating member 450 and the mirrors 410-419 were to be mounted on the scanner frame 431 with a photocurable resin (the spacers 460), then it may be impossible to remove the mirrors 410-419 from the scanner frame 431 when disassembling the scanning unit 400 for maintenance.

Further, the spacer 460 functions as an adhesive to bond the mirrors 410-419 to their respective seating members 450 in the preferred embodiments described above, but the present invention is not limited to this construction. The spacer 460 may function simply to maintain the mounted angles of the mirrors 410-419.

Further, metal was not deposited through vapor deposition in the region of the mirrors 410-419 corresponding to the spacers 460 so that this region can transmit light, but the present invention is not limited to this construction. For example, an opening may be provided in the regions of the mirrors 410-419 corresponding to the spacers 460 to allow the transmission of light.

Further, since light is irradiated from the side of the mirrors 410-419 opposite the spacers 460, light can pass through the region of the mirrors 410-419 corresponding to the spacers 460, but the present invention is not limited to this construction. For example, light may be irradiated onto the spacers 460 laterally.

Further, the seating member 450 is formed of a metal in the preferred embodiments described above, but may also be formed of a synthetic resin, for example.

Further, the mirror clamps 470 press the mirrors 410-419 toward the scanner frame 431 and fix the mirrors 410-419 on the scanner frame 431, but the present invention is not limited to this construction. For example, the mirrors 410-419 may be fixed to the scanner frame 431 simply by the adhesive function of the spacers 460, thereby eliminating the mirror clamp 470.

Further, the opening 472B is provided in order to irradiate light on the spacers 460 in the preferred embodiments described above, but the present invention is not limited to this construction. The mirror clamps 470 may instead by offset from the spacers 460, eliminating the opening 472B.

Further, the protruding support part 451 contacts the reflecting surface 411A of the mirror 411 at a position on an extension of the scanning path L1 in the preferred embodiments described above, but the present invention is not limited to this construction.

Further, in the preferred embodiments described above, the contact point (support point) between the protruding support part 451 and reflecting surface 411A and the pressure application point of the mirror clamp 470 on the mirror 411 when projected onto a plane orthogonal to the thickness direction of the mirrors 410-419 are aligned in the scanning direction, but the present invention is not limited to this construction.

Further, the cover clamp 440 presses against and fixes both the exit hole cover 436 and the cover member 432 against the scanner frame 431 in the preferred embodiments described above, but the present invention is not limited to this construction. For example, the cover member 432 may be detachably assembled to the scanner frame 431 with a fixing means, such as screws, while the exit hole cover 436 may be pressed against and fixed to the cover member 432 or scanner frame 431 or may be fixed to the cover member 432 with a bonding means, such as an adhesive.

Further, in the preferred embodiments described above, the cover clamp 440 presses and fixes the exit hole cover 436 to the casing 430 (cover member 432) side on both ends of the exit hole cover 436 in the scanning direction (longitudinal direction), but the present invention is not limited to this construction. For example, the cover clamp 440 may be configured to press the exit hole cover 436 against the casing 430 (cover member 432) along the entire outer edges of the exit hole cover 436.

Further, in the preferred embodiments described above, the cover clamp 440 is substantially L-shaped, but the present invention is not limited to this construction.

Further, the surface of the exit hole cover 436 on the photosensitive drum 510 side in the preferred embodiments is positioned closer to the photosensitive drums 510 than the outer surface 430A of the casing 430, but the present invention is not limited to this construction. For example, the surface of the exit hole cover 436 on the photosensitive drum 510 side may be positioned flush with the outer surface 430A or may be positioned closer to the toric lens 420 side than the outer surface 430A.

In the preferred embodiments described above, the cover member 432 is provided separately from the main casing part (scanner frame 431 and scanner cover 433), but the present invention is not limited to this construction. For example, the cover member 432 may be formed integrally with the scanner frame 431.

In the preferred embodiments described above, the cover member 432 is formed of a metal, but may be formed of synthetic resin or the like instead. Further, the electric harness 406A is disposed in a region corresponding to the metal cover member 432 in the preferred embodiments described above, but the present invention is not limited to this construction.

In the preferred embodiments described above, the cover member 432 is manufactured by a pressing method, but the present invention is not limited to this construction.

Further, in the preferred embodiments described above, a portion of the toric lenses 420 disposed as the last optical member along the optical path is positioned inside the exit hole 435, but the present invention is not limited to this construction.

Further, in the preferred embodiments described above, a plurality of exit holes 435 are formed in the cover member 432, but a cover member 432 may be provided for each of the exit holes 435.

In the preferred embodiments described above, the surfaces of the plurality of exit hole covers 436 on the photosensitive drum 510 side are all positioned substantially along the same plane, but the present invention is not limited to this construction.

Further, in the preferred embodiments described above, the exit hole cover 436 is provided on the outside of the casing 430, but the exit hole cover 436 may be provided on the inside of the casing 430 instead.

What is claimed is:

1. An optical scanner comprising:
a light source configured to emit a light beam;
a polygon mirror configured to rotate and deflect the light beam to be scanned in a scanning direction;
an optical member configured to focus the light beam deflected by the polygon mirror onto a scanning target;
a casing housing the polygon mirror and the optical member and including a first wall portion having a wall inner surface opposing the polygon mirror and the optical member and a wall outer surface opposing the scanning target, the first wall portion being formed with an exit hole through which the light beam is irradiated toward the scanning target; and
an exit hole cover formed of a light transmissible member and sealed to the wall outer surface to cover the exit hole to prevent dust particles from entering the casing, and wherein a part of the optical member is sunk into the exit hole so that an end of the optical member is positioned closer to the exit hole cover than the wall inner surface while another part of the optical member remains farther away from the exit hole cover than the wall inner surface.

2. The optical scanner according to claim 1, further comprising a pressing member configured to press the exit hole cover toward the first wall portion.

3. The optical scanner according to claim 2, wherein the exit hole cover has a first end and a second end, a line connecting the first end to the second end being parallel to the scanning direction,
wherein the pressing member presses the first end and the second end toward the first wall portion.

4. The optical scanner according to claim 2, wherein the exit hole cover has a cover inner surface opposing the exit hole and a cover outer surface opposing the scanning target, and the casing further includes a second wall portion,
wherein the pressing member includes a contacting part contacting the cover outer surface and a connecting part connected to the second wall portion.

5. The optical scanner according to claim 4, wherein the pressing member is substantially L-shaped, the contacting part having a plate shape extending in a direction parallel to the wall outer surface, the connecting part having a plate shape extending in a direction orthogonal to the wall outer surface.

6. The optical scanner according to claim 1, wherein the exit hole cover has a cover inner surface opposing the exit hole and a cover outer surface opposing the scanning target, the cover outer surface being closer to the scanning target than the wall outer surface to the scanning target.

7. The optical scanner according to claim 6, further comprising an electric harness into which an electric current is flowed and disposed opposing the cover inner surface in the casing,
wherein the first wall portion is formed of a metal.

8. The optical scanner according to claim 7, wherein the first wall portion is a press-molded product having a plate shape.

9. The optical scanner according to claim 1, wherein the optical member includes a plurality of the optical members including 1st optical member to Nth optical member, the light beam deflected by the polygon mirror passing the plurality of optical members in numeric order of the optical members, the Nth optical member having a part sinking into the exit hole.

10. The optical scanner according to claim 6, wherein the wall portion is formed with a plurality of the exit holes.

11. The optical scanner according to claim 10, wherein the exit hole cover includes a plurality of the exit hole covers each disposed on the wall outer surface to cover the plurality of the exit holes respectively,
wherein the plurality of cover outer surfaces is positioned substantially in a same plane.

12. An image-forming device comprising:
an image-carrying member on which a light beam is scanned to form an image on a recording medium; and
an optical scanner comprising:
a light source configured to emit the light beam;
a polygon mirror configured to rotate and deflect the light beam to be scanned in a scanning direction;
an optical member configured to focus the light beam deflected by the polygon mirror onto the image-carrying member;
a casing housing the polygon mirror and the optical member and including a wall portion having a wall inner surface opposing the polygon mirror and the optical member and a wall outer surface opposing the image-carrying member, the wall portion being formed with an exit hole through which the light beam is irradiated toward the image-carrying member; and
an exit hole cover formed of a light transmissible member and sealed to the wall outer surface to cover the exit hole to prevent dust particles from entering the casing, and
wherein a part of the optical member is sunk into the exit hole so that an end of the optical member is positioned closer to the exit hole cover than the wall inner surface while another part of the optical member remains farther away from the exit hole cover than the wall inner surface.

13. An image-forming device comprising:
an image-carrying member on which a light beam is scanned to form a toner image on a recording medium; and
an optical scanner comprising:
a light source configured to emit the light beam;
a polygon mirror configured to rotate and deflect the light beam to be scanned in a scanning direction;
an optical member configured to focus the light beam deflected by the polygon mirror onto the image-carrying member;
a casing housing the polygon mirror and the optical member and including a wall portion having a wall inner surface opposing the polygon mirror and the optical member and a wall outer surface opposing the image-carrying member, the wall portion being formed with a plurality of exit holes through which the light beam is irradiated toward the image-carrying member respectively, the plurality of exit holes being arranged along a direction; and
a plurality of exit hole covers respectively formed of a light transmissible member and sealed to the wall outer surface to cover the corresponding exit hole to prevent dust particles from entering the casing;
a main body on which the optical scanner is mounted; and
a process cartridge accommodating toner to be supplied to the image-carrying member and detachably mounted on the main body along the direction,
wherein the process cartridge includes a cleaning member configured to face each of the plurality of exit hole covers to clean each of the plurality of exit hole covers arranged along the direction when the process cartridge is mounted on or detached from the main body.

* * * * *